United States Patent [19]

Raue et al.

[11] 4,115,413
[45] Sep. 19, 1978

[54] TRIARYL-METHANE DYESTUFFS

[75] Inventors: Roderich Raue, Leverkusen; Willi Eifler, Cologne-Stammheim; Hans-Peter Kuhlthau, Leverkusen, all of Fed. Rep. of Germany

[73] Assignee: Bayer Aktiengesellschaft, Leverkusen, Germany

[21] Appl. No.: 878,952

[22] Filed: Nov. 21, 1969

[30] Foreign Application Priority Data

| Nov. 29, 1968 [DE] | Fed. Rep. of Germany | 1811652 |
| Nov. 28, 1968 [DE] | Fed. Rep. of Germany | 1811336 |
| Nov. 28, 1968 [DE] | Fed. Rep. of Germany | 1811338 |
| Nov. 28, 1968 [DE] | Fed. Rep. of Germany | 1811337 |

[51] Int. Cl.² .................................. C07C 93/14
[52] U.S. Cl. .................................. 260/390; 544/64; 544/166; 544/174; 548/373; 260/289 R; 260/326.11 R; 260/387; 260/388; 260/393; 8/4; 8/177 AB; 8/179
[58] Field of Search .......... 260/247 A, 310 R, 326.11, 260/390, 393, 388, 247.7 Z, 310 D, 289 R, 326.11 R, 247.7 S, 387

[56] References Cited

U.S. PATENT DOCUMENTS 3,184,483 5/1965 Quint et al. ............................ 260/390

*Primary Examiner*—Jane S. Myers
*Attorney, Agent, or Firm*—Plumley and Tyner

[57] ABSTRACT

Triaryl-methane dyestuffs which are free from sulfonic acid and carboxylic acid groups and are selected from the group consisting of dyestuffs having one of the following four formulae:

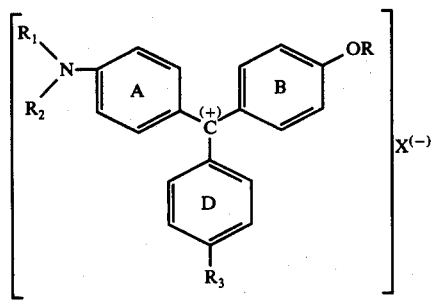

I.

wherein R is alkyl, aralkyl, cycloalkyl or aryl; $R_1$ is hydrogen, alkyl, aralkyl or cycloalkyl; $R_2$ is alkyl, aralkyl, cycloalkyl or aryl; $R_1$ and $R_2$ additionally including divalent alkylene when joined together with the nitrogen or with a carbon atom in the o-position in the ring A to form a heterocyclic ring; $R_3$ is hydrogen, alkyl, aralkyl, aryl, aralkoxy, aryloxy, halogen, carboxylic acid ester radical, carbonamido, sulfonamido, cyano, nitro, alkylsulfonyl, aryalkylsulfonyl, arylsulfonyl or acyl; and X is the radical of an anion;

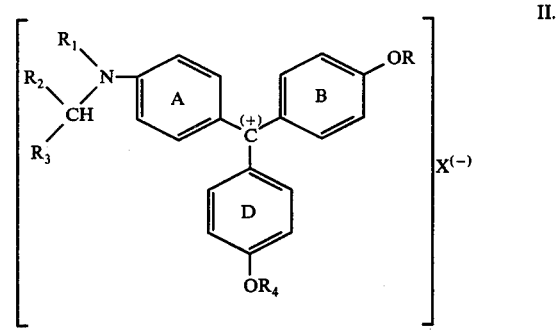

II.

wherein R is alkyl or cycloalkyl; $R_1$ is hydrogen, alkyl, aralkyl, cycloalkyl or aryl; $R_2$ is alkyl, cycloalkyl, aralkyl or aryl, halogen or cyano; $R_1$ and $R_2$ additionally include divalent alkylene when joined together with the nitrogen atom or with a carbon atom in the o-position in the ring A to form a heterocyclic ring; $R_3$ is hydrogen or alkyl; $R_4$ is alkyl or cycloalkyl; and X is the radical of an anion;

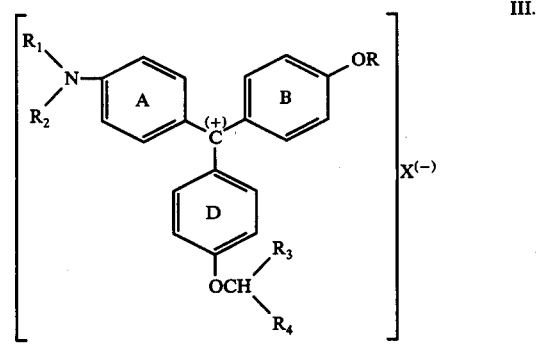

III.

wherein R is alkyl or cycloalkyl; $R_1$ is hydrogen or methyl; $R_2$ is methyl, aryl, or cycloalkyl; $R_3$ is hydrogen or alkyl; $R_4$ is alkyl or cycloalkyl; $R_3$ and $R_4$ additionally include divalent alkylene when joined together to form a carbocyclic ring; and X is the radical of an anion; and

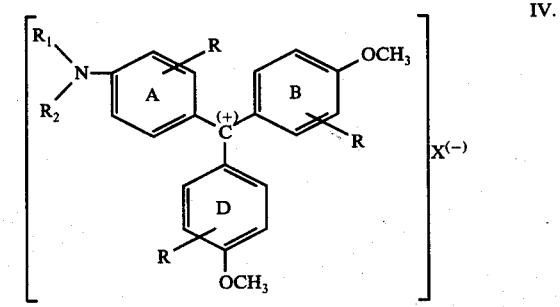

IV.

wherein at least one R is halogen, alkyl, or alkoxy and the other R's are hydrogen, halogen, alkyl, or alkoxy; $R_1$ is hydrogen or methyl; $R_2$ is methyl, aryl, or cycloalkyl; and X is the radical of an anion.

Process of preparing the above dyestuffs by condensation of an appropriate benzophenone with an aromatic amine or by the oxidation of the corresponding leuco compound. These dyestuffs are particularly useful in dyeing or printing materials made of polymers of acrylonitrile, polymers of as.-dicyanoethylene, and acid-modified aromatic polyesters.

15 Claims, No Drawings

TRIARYL-METHANE DYESTUFFS

Our co-pending application No. 878,549 filed Nov. 20, 1969, now U.S. Pat. No. 3,647,349, (Le A 11833) describes and claims a new process for dyeing or printing shaped materials of polymers or copolymers of acrylonitrile or as.-dicyanoethylene, or of acid-modified aromatic polyesters. The process is characterized by using therefor a wide range of triaryl-methane compounds of which the formulae and numerous examples are given and described.

With very few exceptions the compounds to be used in said process are new, and the purpose of the present application is to classify and describe the new compounds and to claim them as new triaryl-methane dyestuffs, together with processes for producing the same. This is the subject matter of the present invention.

It is convenient, for the purpose of clarity, to classify the new dyestuffs in groups under separate formulae even though some dyestuffs may come within the scope of more than one formula.

It is also convenient, for the purpose of simplification, to use in different formulae the same symbols with different meanings given to them. This avoids undue multiplication of the number of different symbols used, while avoiding confusion because each particular formula will stand on its own with the symbols used therein specifically defined in relation only to such particular formula.

The following are the new dyestuffs, all according to the present invention:

GROUP 1

Triaryl-methane dyestuffs which are free from sulfonic acid and carboxylic acid groups and correspond to the general formula

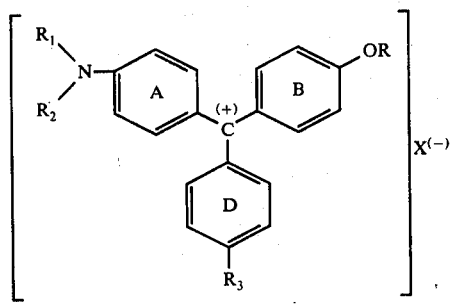

(I)

in which R stands for an alkyl, aralkyl, cycloalkyl or aryl radical; $R_1$ stands for hydrogen or for an alkyl, aralkyl or cycloalkyl radical; $R_2$ stands for an alkyl, aralkyl, cycloalkyl or aryl radical; $R_1$ and $R_2$ together with the nitrogen atom, or $R_1$ or $R_2$ with a carbon atom in the o-position in the ring A may form a heterocyclic ring; $R_3$ stands for hydrogen, an alkyl, aralkyl, aryl, aralkoxy, aryloxy radical, a halogen substituent, a carboxylic acid ester, carbonamide, sulfonamide, cyano, nitro, alkylsulfonyl, aralkylsulfonyl, arylsulfonyl or acyl group; X stands for the radical of an anion; and the dyestuffs may contain one or more further substituents, with the exception of sulfonic acid and carboxylic acid groups, in the aliphatic, cycloaliphatic and aromatic radicals, including the phenylene radicals A, B and D. The phenylene ring A, B, and/or D may contain an annelated ring, particularly a six-membered monocyclic radical, as for example, in a dyestuff of the formula

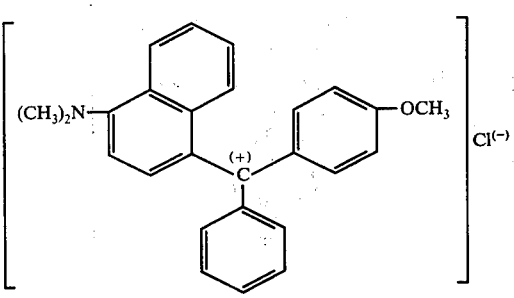

A particularly valuable selection of dyestuffs, free from sulfonic acid and carboxylic acid groups, within the scope of formula (I) corresponds to the formula

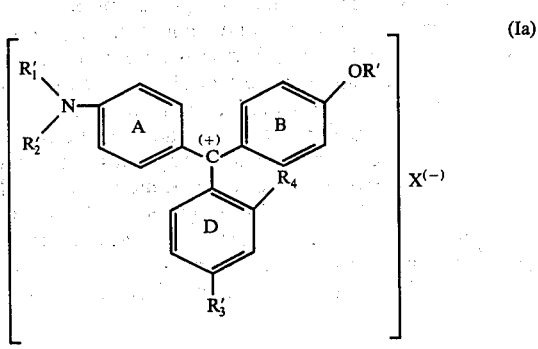

(Ia)

in which R', $R_1'$ and $R_2'$ stand for optionally substituted lower alkyl radicals with 1 to 4 carbon atoms; $R_1'$ and $R_2'$ together with the nitrogen atom, or $R_1'$ or $R_2'$ with a carbon atom in the o-position of the phenylene ring A may form a heterocyclic ring; $R_3'$ stands for hydrogen or an alkyl radical with 1 to 4 carbon atoms; $R_4$ stands for hydrogen, halogen, especially chlorine or bromine, or a $C_1$ to $C_4$ alkyl or alkoxy radical; X stands for the radical of an anion.

Another valuable selection of dyestuffs, free from sulfonic acid and carboxylic acid groups, within the scope of formula (I) corresponds to the formula

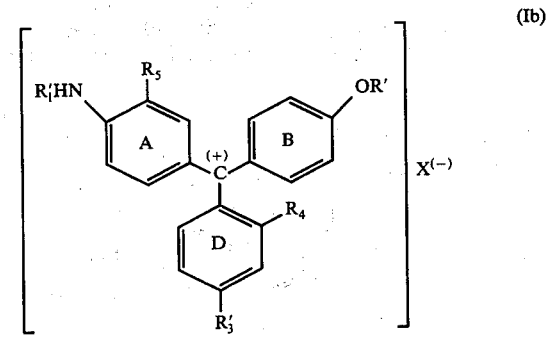

(Ib)

in which R', $R_1'$, $R_3'$, $R_4$ and X have the same meaning as in formula (Ia), and $R_5$ stands for hydrogen or a lower alkyl radical.

GROUP 2

Triaryl-methane dyestuffs which are free from sulfonic acid and carboxylic acid groups and correspond to the general formula

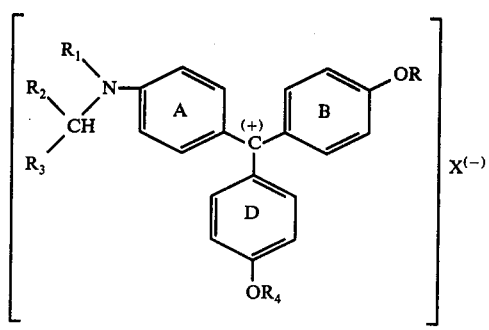

(II)

in which R stands for an alkyl or cycloalkyl radical; $R_1$ stands for hydrogen, an alkyl, aralkyl, cycloalkyl or aryl radical; $R_2$ stands for an alkyl, cycloalkyl, aralkyl or aryl radical, a halogen substituent or the cyano group; $R_1$ and $R_2$ together with the nitrogen atom or $R_1$ or $R_2$ with a carbon atom in the o-position in the ring A, may form a heterocyclic ring; $R_3$ stands for hydrogen or an alkyl radical; $R_4$ stands for an alkyl or cycloalkyl radical; X is the radical of an anion; and the dyestuffs may contain further substituents, with the exception of sulfonic acid and carboxylic acid groups, in the aliphatic, cycloaliphatic and aromatic radicals, including the phenylene radicals A, B and D illustrated in the formula. The phenylene ring A, B and/or D may contain an annelated ring, particularly a six-membered monocyclic radical, as, for example, in a dyestuff of the formula

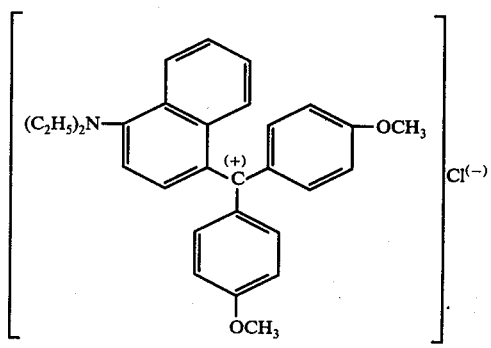

A particularly valuable selection of dyestuffs, free from sulfonic acid and carboxylic acid groups, within the scope of formula (II) corresponds to the formula

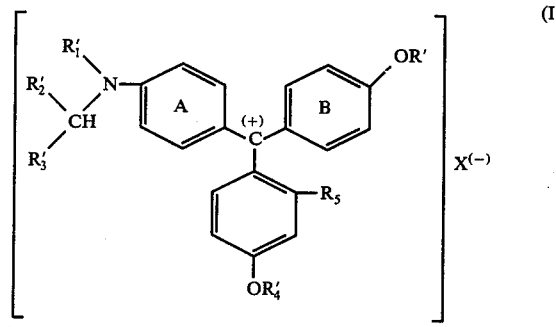

(IIa)

in which R', $R_1'$, and $R_4'$ stand for optionally substituted lower alkyl radicals with 1 to 4 carbon atoms; $R_2'$ stands for the methyl, ethyl, propyl and isopropyl group; $R_1'$ and $R_2'$ together with the nitrogen atom, or $R_1'$ or $R_2'$ with a carbon atom in the o-position in the ring A may form a heterocyclic ring; $R_3'$ stands for hydrogen or the methyl or ethyl group; $R_5$ stands for hydrogen, a halogen substituent, especially chlorine or bromine, or a lower alkyl or alkoxy radical with 1 to 4 carbon atoms, and X is the radical of an anion.

Another valuable selection of dyestuffs free from sulfonic acid and carboxylic acid groups, within the scope of formula (II) corresponds to the formula

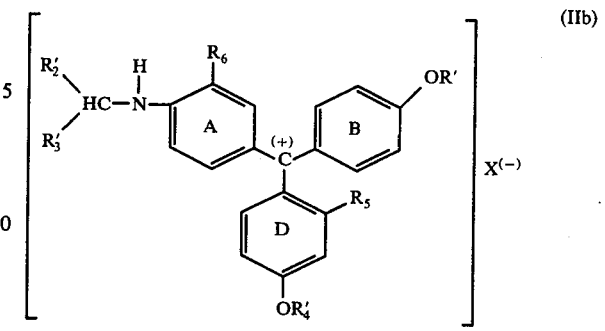

(IIb)

in which R', $R_2'$, $R_3'$, $R_4'$, $R_5$ and X have the same meaning as in formula (IIa), and $R_6$ stands for hydrogen or a lower alkyl radical.

GROUP 3

Triaryl-methane dyestuffs which are free from sulfonic acid and carboxylic acid groups and correspond to the formula

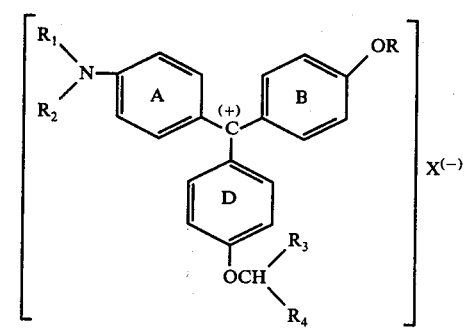

(III)

in which R stands for an alkyl or cycloalkyl radical; $R_1$ stands for hydrogen or the methyl group; $R_2$ stands for the methyl group, an aryl or cycloalkyl radical; $R_3$ stands for hydrogen or an alkyl group; $R_4$ stands for an alkyl or cycloalkyl group; $R_3$ and $R_4$ may also be linked to one another to form a carbocyclic ring; X stands for the radical of an anion; and the dyestuffs may contain further substituents, with the exception of sulfonic acid and carboxylic acid groups, in the aliphatic, cycloaliphatic and aromatic radicals, including the phenylene radicals A, B and D illustrated in the formula.

The phenylene ring A, B and/or D may contain an annelated ring, particularly a six-membered monocyclic radical, as, for example, in a dyestuff of the formula

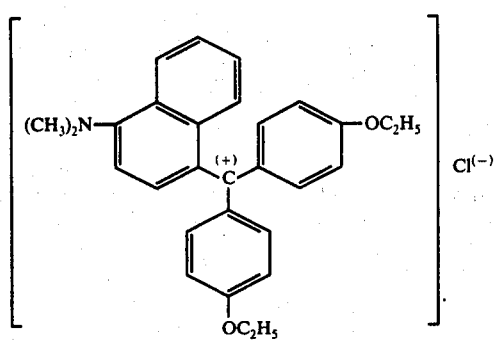

A particularly valuable selection of dyestuffs, free from sulfonic acid and carboxylic acid groups, within the scope of formula (III) corresponds to the formula

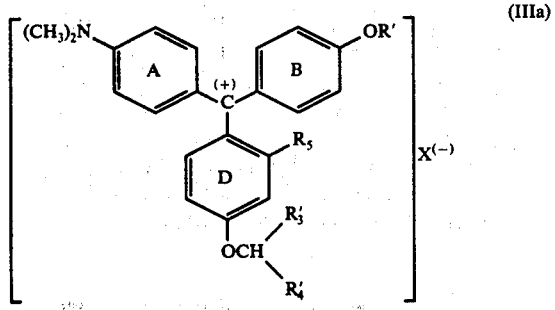
(IIIa)

in which R' and $R_3'$ stand for optionally substituted lower alkyl radicals with 1 to 4 carbon atoms; $R_4'$ stands for hydrogen or a lower alkyl radical with 1 to 4 carbon atoms; $R_5$ stands for hydrogen, a halogen substituent, especially chlorine and bromine, or a lower alkyl or alkoxy radical with 1 to 4 carbon atoms; and X stands for the radical of an anion.

Another valuable selection of dyestuffs, free from sulfonic acid and carboxylic acid groups, within the scope of formula (III) corresponds to the formula

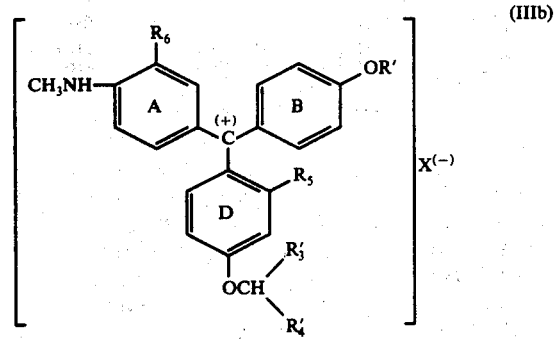
(IIIb)

in which R', $R_3'$, $R_4'$, $R_5$ and X have the same meaning as in formula (IIIa), and $R_6$ stands for hydrogen or a lower alkyl radical.

GROUP 4

Triaryl-methane dyestuffs which are free from sulfonic acid and carboxylic acid groups and correspond to the general formula

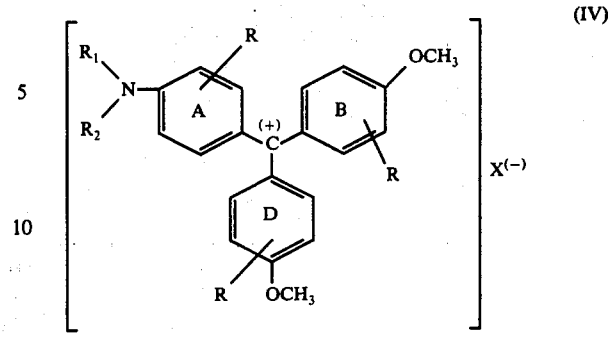
(IV)

in which at least one of the radicals R stands for a halogen substituent, an alkyl or alkoxy group; the other radicals R stand for hydrogen, a halogen substituent, an alkyl or alkoxy group; $R_1$ stands for hydrogen or the methyl group; $R_2$ stands for the methyl group, an aryl or a cycloalkyl radical; X is the radical of an anion; and the dyestuffs may contain further substituents with the exception of sulfonic acid and carboxylic acid groups, in the aliphatic, cycloaliphatic and aromatic radicals, including the phenylene radicals A, B and D illustrated in the formula. The phenylene ring A, B and/or D may contain an annelated ring, particularly a six-membered monocyclic radical, as, for example, in a dyestuff of the formula

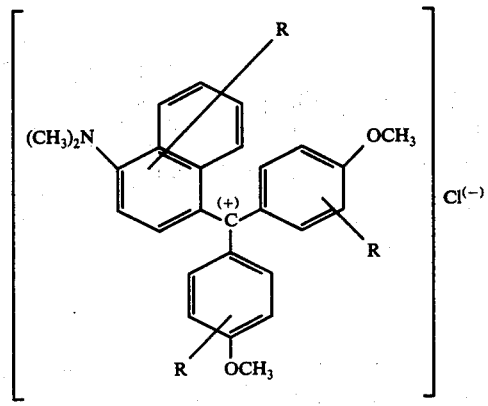

A particularly valuable selection of dyestuffs, free from sulfonic acid and carboxylic acid groups, within the scope of formula (IV) corresponds to the formula

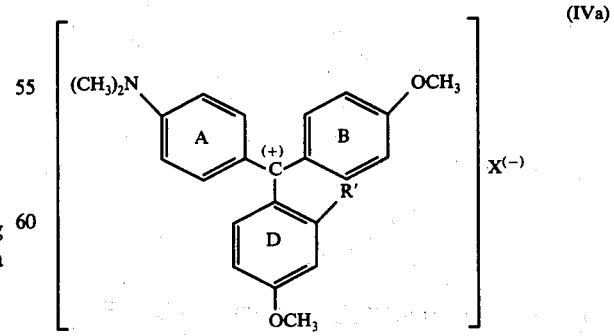
(IVa)

in which R' stands for an alkyl or alkoxy group with 1 to 4 carbon atoms or a halogen substituent, and X is the radical of an anion.

Another valuable selection of dyestuffs, free from sulfonic acid and carboxylic acid groups, within the scope of formula (IV) corresponds to the formula

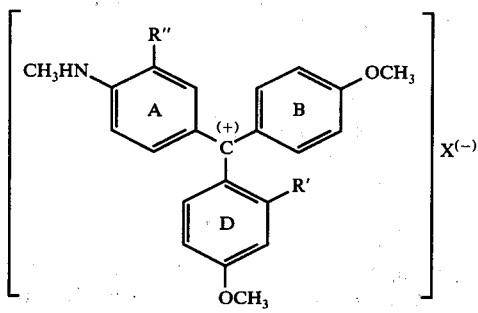
(IVb)

in which R' and X have the same meaning as in formula (IVa), and R" stands for an alkyl radical with 1 to 4 carbon atoms.

The new dyestuffs of Group 1 are obtainable by condensing, in the presence of acidic condensation agents, benzophenones of the general formula

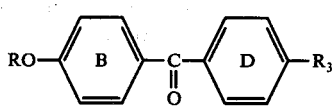
(V)

in which R and $R_3$ have the same meaning as given in respect of the formula (I), or as given in respect of R' and $R_3'$ in the formulae (Ia) and (Ib), and the rings B and D may be further substituted as hereinbefore described, with aromatic amines of the formula

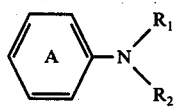
(VI)

in which $R_1$ and $R_2$ have the same meaning as given in respect of formula (I), or as given in respect of $R_1'$ and $R_2'$ in formula (Ia), or $R_1$ has the meaning of $R_1'$ in formula (Ia) and $R_2$ is hydrogen. The ring A may be further substituted as hereinbefore described. Starting components are selected which are free from sulfonic acid and carboxylic acid groups.

The new dyestuffs of Group 2 are obtainable by condensing, in the presence of acidic condensation agents, benzophenones of the general formula

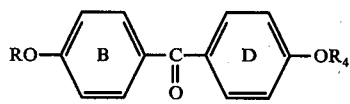
(VII)

in which R and $R_4$ have the same meaning as given in respect of formula (II) or as given in respect of R' and $R_4'$ in formulae (IIa) and (IIb), and the rings B and D may be further substituted as hereinbefore described, with aromatic amines of the general formula

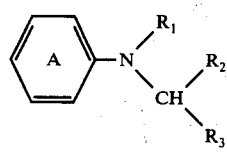
(VIII)

in which $R_1$, $R_2$ and $R_3$ have the same meaning as in formula (II) or as given for $R_1'$, $R_2'$ and $R_3'$ in formula (IIa) or $R_1$ is hydrogen and $R_2$ and $R_3$ have the same meaning as given for $R_2'$ and $R_3'$ in formula (IIa). Starting components are selected which are free from sulfonic acid and carboxylic acid groups.

The new dyestuffs of Group 3 are obtainable by condensing, in the presence of acidic condensation agents, benzophenones of the general formula

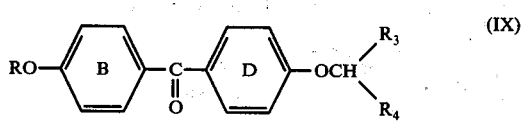
(IX)

in which R, $R_3$ and $R_4$ have the same meaning as given in respect of formula (III), or as given in respect of R', $R_3'$ and $R_4'$ in formula (IIIa), and the rings B and D may be further substituted as hereinbefore described, with aromatic amines of the general formula

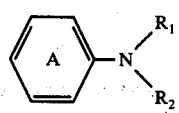
(X)

in which $R_1$ and $R_2$ have the same meaning as given in respect of formula (III), or are both $CH_3$ groups, or one is $CH_3$ and the other is hydrogen, and the ring A may be further substituted as hereinbefore described. Starting components are selected which are free from sulfonic acid and carboxylic acid groups.

The new dyestuffs of Group 4 are obtainable by condensing in the presence of acidic condensation agents, benzophenones of the general formula

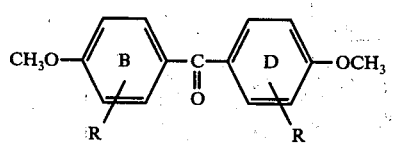
(XI)

in which R has the same meaning as in formula (IV), and the rings B and D may be further substituted as hereinbefore described, with aromatic amines of the general formula

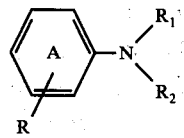
(XII)

in which R has the same meaning as given in formula (IV) and $R_1$ and $R_2$ have the same meaning as in formula (IV) or $R_1$ and $R_2$ are both $CH_3$ or one is $CH_3$ and the other is hydrogen. Starting components are selected which are free from sulfonic acid and carboxylic acid groups.

Examples of benzophenones of the formulae (V), (VII), (IX) and (XI), collectively, are the following: 4-methoxybenzophenone, 4-ethoxybenzophenone, 4-methoxy-2-methylbenzophenone, 4-phenoxybenzophenone, 4-methoxy-4'-methylbenzophenone, 4-methoxy-2',4'-dimethylbenzophenone, 4-methoxy-2',5'-dimethylbenzophenone, 4-methoxy-3',4'-dimethylbenzophenone, 4-methoxy-2',4',5'-trimethylbenzophenone, 4-methoxy-2'-chlorobenzophenone, 4-methoxy-3'-chlorobenzo-phenone, 4-methoxy-4'-chlorobenzophenone, 4-methoxy-2',5'-dichlorobenzophenone, 2,4-dimethoxybenzophenone, 2,4-dimethoxy-2',5'-dichlorobenzophenone, 2,4-dimethoxy-2'-chlorobenzophenone, 2,4-dimethoxy-4'-chlorobenzophenone, 2,4-dimethoxy-3'-chlorobenzophenone, 4-methoxy-2',4'-diisopropylbenzophenone, 4-methoxy-2',5'-diisopropylbenzo-phenone, 2,4-dimethoxy-2'-bromobenzophenone, 4-methoxy-2,4'-dimethylbenzophenone, 4-methoxy-2-methyl-2'-chlorobenzo-phenone, 4-methoxy-2-methyl-2'-bromobenzophenone, 4-methoxy-2'-bromobenzophenone, 4,4'-dimethoxybenzophenone, 4,4'-diethoxybenzophenone, 2,4,4'-trimethoxybenzophenone, 4-methoxy-4'-ethoxybenzophenone, 4-ethoxy-4'-propoxybenzo-phenone, 4,4'-dimethoxy-2-methylbenzophenone, 4,4'-dimethoxy-2-chloro-5-methylbenzophenone, 4,4'-di-n-propoxybenzophenone, 4,4'-dimethoxy-3,3'-dimethylbenzophenone, 4-methoxy-4'-phenoxybenzophenone, 4,4'-di-n-butoxybenzophenone, 4,4'-dimethoxy-3,3'-diethylbenzophenone, 4,4'-dimethoxy-3,3'-dichlorobenzophenone, 3,4,4'-trimethoxybenzophenone, 4,4'-dimethoxy-3,5-dimethylbenzophenone, 4,4'-dimethoxy-3-methyl-5-chlorobenzophenone, 4-methoxy-4'-isopropoxy-benzophenone, 4,4'-dimethoxy-3-isopropylbenzophenone, 4,4'-dimethoxy-2-chlorobenzophenone, 4,4'-dimethoxy-3-chlorobenzophenone, 4,4'-dimethoxy-2-methyl-5-chloro-benzophenone, 4,4'-dimethoxy-2-chloro-3-methylbenzophenone, 4,4'-dimethoxy-3-methylbenzophenone, 4,4'-dimethoxy-2,5-dimethylbenzophenone, 2,4'-dimethoxybenzophenone, 3,4'-dimethoxybenzophenone, 4,2'-dimethoxy-2-chloro-3-methyl-benzophenone, 3-methoxy-4'-propoxybenzophenone, 4,4'-dimethoxy-2,3-dimethylbenzophenone, 4-methoxy-4'-isopropoxybenzophenone, 4-methoxy-4'-butoxybenzophenone, 4,4'-dimethoxy-3,5-diisopropylbenzophenone, 4,2'-dimethoxy-3-chlorobenzophenone, 4,2'-dimethoxy-2-chlorobenzophenone, 4,2'-dimethoxy-2-methyl-5-chlorobenzophenone, 4,2'-di-methoxy-2-chloro-5-methylbenzophenone, 4,3'-dimethoxy-2-methylbenzophenone, 4-methoxy-4'-propoxy-2-methylbenzo-phenone, 4-ethoxy-2'-methoxybenzophenone, 4-ethoxy-3'-methoxybenzophenone, 4,2',5'-trimethoxybenzophenone, 4,3,3'-trimethoxybenzophenone, 4,3,2'-trimethoxybenzophenone, 4,2'-dimethoxy-3-methylbenzophenone, 4,2'-dimethoxy-2-methylbenzophenone, 4,2'-dimethoxy-5'-methylbenzophenone, 4-propoxy-2'-methoxybenzophenone, 4-methoxy-4'-methyl-mercaptobenzophenone, 4-ethoxy-2-methylbenzophenone, 4-methoxy-2-methyl-6-ethylbenzophenone, 4-n-butoxy-2-methyl-benzophenone, 4-methoxy-3'-methylbenzophenone, 4-methoxy-4'-tert.-butylbenzophenone, 4-ethoxy-3'-methylbenzophenone, 4-methoxy-2,3'-dimethylbenzophenone, 4-methoxy-2-methyl-4'-tert.-butylbenzophenone, 4-methoxy-2'-methylbenzophenone, 4-ethoxy-2'-methylbenzophenone, 4-n-propoxy-2'-methylbenzo-phenone, 4-isopropoxy-2'-methylbenzophenone, 4-n-butoxy-2'-methylbenzophenone, 4-methoxy-2,2'-dimethylbenzophenone, 2,4-dimethoxy-3'-methylbenzophenone, 4-methoxy-4'-phenoxy-benzophenone, 2-methoxy-1-(4'-methoxybenzoyl)-naphthalene, 4,4'-dimethoxy-2-methyl-6-ethylbenzophenone, 4-methoxy-4'-cyclohexylbenzophenone, 4,4'-dicyclohexyloxybenzophenone and 2,4,4'-triethoxybenzophenone.

Examples of aromatic amines of the formulae (VI), (VIII), (X) and (XII), collectively, are the following: dimethylaniline, diethylaniline, di-n-propylaniline, di-n-butylaniline, N-methyl-N-β-hydroxyethylaniline, N-butyl-N-β-hydroxyethylaniline, N,N-dihydroxyethylaniline, N,N-di-β-chloro-ethylaniline, N-methyl-N-β-cyanoethylaniline, N-methyl-N-β-chloroethylaniline, N-ethyl-N-β-chloroethyl-aniline, N-butyl-N-β-chloroethylaniline, N-ethyl-N-β-dimethylaminoethylaniline, N,N-bis-α,β-dihydroxypropyl-aniline, N-methyl-N-benzylaniline, N-ethyl-N-benzylaniline, N,N-dibenzylaniline, N-methyldiphenylamine, N-methyl-N-(4-ethoxyphenyl)-aniline, N-phenylmorpholine, 2-methyl-N, N-dimethylaniline, 3-methyl-N,N-dimethylaniline, 3-chloro-N,N-dimethylaniline, 3-chloro-N,N-diethylaniline, 3-methyl-N-ethyl-N-benzylaniline, 3-methyl-N,N-dibenzyl-aniline, 3-methyl-N-ethyl-N-β-hydroxyethylaniline, 3-methyl-N-ethyl-N-β-dimethylaminoethylaniline, 3-methyl-N, N-dihydroxyethylaniline, 3-nitro-N,N-diethylaniline, 3-hydroxy-N,N-dimethylaniline, 3-hydroxy-N,N-diethylaniline, 3-ethoxy-N,N-diethylaniline, 2-methyl-5-hydroxy-N,N-di-methylaniline, N,N-diisopropylaniline, 3-methoxy-N,N-dimethylaniline, 3-methoxy-N,N-diethylaniline, 2-methyl-5-methoxy-N,N-dimethylaniline, N-methyl-N-β-methoxyethyl-aniline, N,N-di-β-methoxyethylaniline, N-methyl-N-isobutyl-aniline, N-methyl-N-isopropylaniline, N-ethyl-N-isopropyl-aniline, N-isopropyl-N-isobutylaniline, N-methyl-N-ethylaniline, N-methyl-N-propylaniline, N-ethyl-N-propylaniline, N-propyl-N-isopropylaniline, 1-dimethylaminonaphthalene, 1-diethylaminonaphthalene, N-ethyl-N-β-hydroxyethylaniline, 3-methyl-N-ethyl-N-β-chloroethylaniline, 3-methyl-N-ethyl-N-β-cyanoethylaniline, 3-ethoxy-N,N-diethylaniline, 2-ethoxy-N-β-cyanoethylaniline, 2-methyl-N-β-cyanoethylaniline, 2-methyl-N-benzylaniline, 2-methyl-N-methylaniline, 2-methyl-N-ethylaniline, N-butylaniline, N-isobutylaniline, N-β-cyanoethylaniline, N-β-chloroethylaniline, N-benzyl-aniline, N-β-cyanoethyl-2-ethylaniline, 2,3-dimethyl-N-β-cyanoethylaniline, 2,5-dimethyl-N-β-cyanoethylaniline, 2-hydroxy-N-β-cyanoethylaniline, 3-methyl-N-ethylaniline, 3-methyl-N-butylaniline, N-β-hydroxyethylaniline, tetrahydroquinoline, 2-methyl-2,3-dihydroindole, 1,2,3,3-tetramethylindoline, 1-phenyl-3-methylpyrazoline, 1,3-dimethylpyrazoline, 1,3-diphenylpyrazoline, 2,3-dimethyl-N-methylaniline, 2,5-dimethyl-N-methylaniline, N-methyl-N-cyclohexylaniline, N-methyldiphenylamine, N-methyl-N-(4-methylphenyl)-aniline, N-methyl-N-(4-chlorophenyl)-aniline, N-methyl-N-(4-bromophenyl)-aniline, 2-methyl-N,N-dimethyl-aniline, N-methyl-N-(3-methyl-phenyl)-aniline and N-methyl-N-(3-methoxy-phenyl)-aniline.

Suitable acidic condensation agents are, for example, phosphorus oxychloride, phosphorus pentoxide, thionyl chloride, phosgene, zinc chloride, aluminum chloride, tin chloride, sulfuric acid or phosphoric acid.

The reaction can be carried out in the presence or absence of an inert solvent. Suitable solvents are, for example, chlorobenzene, o-dichlorobenzene, toluene, xylene, benzene, ligroin, dioxan, cyclohexane, carbon tetrachloride, chloroform or ethylene chloride.

In general, the reaction is carried out at an elevated temperature, for example, at 30°–160° C. preferably at 40°–120° C.

According to another process, the new dyestuffs can be prepared by oxidation of the corresponding leuco compounds which, of course, have the same formulae as those hereinbefore given and described under the headings of Groups 1 to 4, subject to the modification that

is replaced by

The oxidation is preferably carried out by means of suitable dehydrogenating or oxidizing agents, preferably in an acidic medium, for example in acetic acid, dilute sulfuric acid, dilute hydrochloric acid or in mixtures of these acids, Water-miscible organic solvents, such as alcohol, dimethylformamide or acetonitrile, may be added to improve the solubility. Suitable dehydrogenating or oxidizing agents are the agents usually applied in triphenyl-methane chemistry, for example, iron (III) or copper (II) salts, their complex compounds, alkali metal dichromates, lead (IV) oxide and its salts, such as lead tetracetate, nitrous acid, peroxide compounds, such as potassium persulfate, hydrogen peroxide, as well as atmospheric oxygen, possibly with the addition of oxygen-transferring catalysts, such as metal ions.

The leuco compounds to be oxidized can be prepared by condensing benzohydrol compounds having the same formulae as formulae (V), (VII), (IX) and (XI) subject to the modification that

is replaced by

with the various aromatic amines that have hereinbefore been described.

The anionic radicals $X^{(-)}$ may be inorganic as well as organic ions; examples are, $Cl^-$, $Br^-$, $I^-$, $CH_3SO_4^-$, $C_2H_5SO_4^-$, p-toluene-sulfonate, $HSO_4^-$, benzene-sulfonate, p-chlorobenzene-sulfonate, phosphate, acetate, formate, propionate, oxalate, lactate, maleinate, crotonate, tartrate, citrate, $NO_3^-$, perchlorate, $ZnCl_3^-$. The type of anionic radical is of no importance for the properties of the dyestuffs, provided they are substantially colorless radicals which do not impair the solubility of the dyestuffs in an undesirable manner.

The new dyestuffs are valuable and can be used for the dyeing and printing of materials consisting of leather, tanned cotton, cellulose acetate, synthetic superpolyamides and -polyurethanes as well as for the dyeing of lignin-containing fibers, such as coco, jute and sisal. They are further suited for the production of writing liquids, stamp-pad inks, pastes for ball point pens, and they can be used in offset printing. Above all, they are well suited for the dyeing and printing of materials, especially flocks, fibers, filaments, ribbons, and woven or knitted fabrics, consisting completely or in part of acrylonitrile polymers and copolymers, as.-dicyanoethylene, or acidmodified aromatic polyesters or superpolyamides.

Acrylonitrile copolymers are, for example, copolymers of acrylonitrile with other vinyl compounds, such as vinyl chloride, vinylidene chloride, vinyl fluoride, vinyl acetate, vinyl pyridine, vinyl imidazole, vinyl alcohol, acrylic and methacrylic acid esters and amides, and as.-dicyanoethylene.

Acid-modified aromatic polyesters are, for example, poly-condensation products of sulfo-terephthalic acid and ethylene glycol, i.e. polyethylene glycol terephthalates containing sulfonic acid groups (type DACRON 64 of E. I. du Pont de Nemours & Company), such as are described in Belgian Patent Specification No. 549,179 and U.S. Pat. No. 2,893,816. Acid-modified superpolyamides are, for example, sulpho group-containing superpolyamides (type Dye I of Monsanto Company and BCF Nylon Carpet Yarn type 844 of E. I. du Pont de Nemours and Company).

Dyeing of acrylonitrile polymers and copolymers, as.-dicyanoethylene and acid-modified aromatic polyesters can be carried out from a weakly acidic bath; the material is expediently introduced into the dyebath at 40°–60° C. and dyeing is then performed at boiling temperature. It is also possible to dye under pressure at temperatures above 100° C. Moreover, the dyestuffs can be added to spinning solutions serving for the production of fibers containing polyacrylonitrile, or they can be applied to the unstretched fiber. It is accordingly to be understood that the expression "dyeing of shaped materials" as used herein includes the dyeing of what will be used to produce the shaped material.

The dyeings which can be obtained according to the invention are characterized by vivid, predominantly red and violet shades of very good fastness to light and washing. The good affinity of the dyestuffs and their good fastness to cross-dyeing in an acetic acid and sulfuric acid medium should be emphasized.

The dyestuffs can be used individually or in mixtures. When materials of polyacrylonitrile are dyed, mixtures frequently show a higher strength of color.

With anionic precipitation agents, such as alumina, tannin, phosphotungstic (molybdic) acids, the dyestuffs form pigments which are fast to light and can be used to advantage in paper printing.

The following Examples are given for the purpose of illustrating the invention and its usefulness. Parts by volume are related to parts by weight as are milliliters to grams.

EXAMPLE 1

24.2 Parts by weight 2,4-dimethoxy-benzophenone are added to 35 parts by weight phosphorus oxychloride, and 14.9 parts by weight diethyl-aniline are subsequently introduced whereupon the temperature slightly rises. 15 Parts by weight phosphorus pentoxide are then added, and the reaction mixture is slowly heated to 100° C. After stirring for 5 hours, the warm melt is poured into 800 parts by weight of water; and the dark-red solution is mixed with 10 parts by weight of a 50% aqueous zinc chloride solution. After stirring for several hours, the dyestuff of the formula

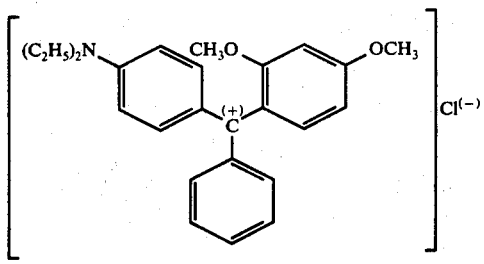

crystallizes in the form of the zinc chloride double salt. It is filtered off with suction and further purified by dissolving it in 10% acetic acid and precipitation with a 50% aqueous zinc chloride solution. Materials of polyacrylonitrile are dyed with this dyestuff in a bluish red shade of outstanding fastness to light.

EXAMPLE 2

27.2 Parts by weight 2,4,4'-trimethoxybenzophenone are added to 35 parts by weight phosphorus oxychloride, and 14.9 parts by weight diethyl-aniline are then added whereupon the temperature slightly rises. 15 Parts by weight phosphorus pentoxide are then added and the reaction mixture is slowly heated to 100° C. After stirring for 5 hours, the warm melt is poured into 800 parts by weight of water and the dark-red solution is mixed with 10 parts by weight of a 50% aqueous zinc chloride solution. After stirring for several hours, the dyestuff of the formula

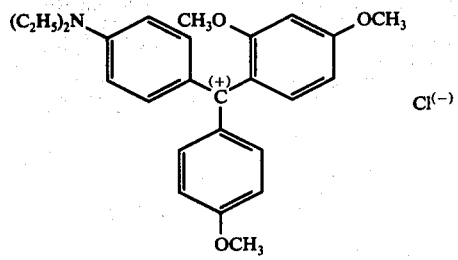

crystallizes in the form of the zinc chloride double salt. It is filtered off with suction and further purified by dissolving it in 10% acetic acid and precipitation with a 50% aqueous zinc chloride solution. Materials of polyacrylonitrile are dyed with this dyestuff in a reddish Bordeaux shade of outstanding fastness to light.

EXAMPLE 3

27.0 Parts by weight 4,4'-diethoxy-benzophenone and 12.1 parts by weight, N,N-dimethyl-aniline are introduced into 30 parts by volume phosphorus oxychloride, and 14 parts by weight phosphorus pentoxide are added; the temperature rises up to 130° C. as soon as the reaction has started upon heating on a water bath. Heating on the boiling water bath is continued for 2 hours, and the melt is then poured into 500 parts by volume of water. The dyestuff resin which is precipitated after the addition of zinc chloride is separated and reprecipitated from water with the addition of some glacial acetic acid. Complete precipitation is again carried out with zinc chloride. The dyestuff of the formula

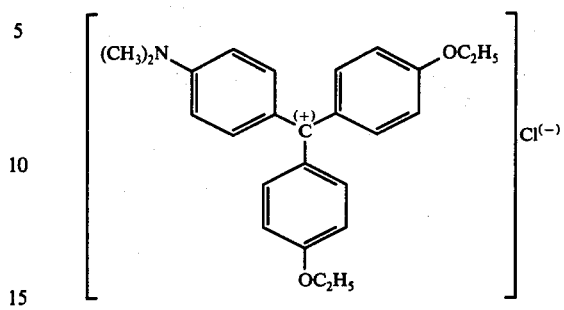

is isolated in the form of the zinc chloride double salt by filtering off with suction, and dried in a vacuum at 50° C. Materials of polyacrylonitrile are dyed with this dyestuff in a strongly bluish red shade of outstanding fastness to light.

EXAMPLE 4

27.2 Parts by weight 2,4,4'-trimethoxy-benzophenone are added to 35 parts by weight phosphorus oxychloride, and 12.1 parts by weight dimethyl-aniline are subsequently introduced whereupon the temperature slightly rises. 15 Parts by weight phosphorus pentoxide are then added, and the reaction mixture is slowly heated to 100° C. After stirring for 5 hours, the warm melt is poured into 800 parts by weight of water, the drak-red solution is mixed with 15 parts by weight of a 50% aqueous zinc chloride solution, and the dyestuff resin is separated. It is dissolved in 1200 parts by volume of water, the solution is clarified with active charcoal, and the dyestuff of the formula

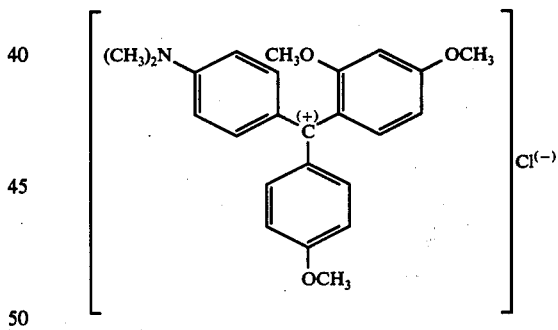

is precipitated in the form of the zinc chloride double salt. Materials of polyacrylonitrile are dyed with this dyestuff in a reddish Bordeaux shade of outstanding fastness to light.

Similar valuable dyeings are obtained with dyestuffs which have been prepared in the manner described above from the benzophenones and aromatic amines set out in the following Table.

| Dyestuff from 4-methoxybenzophenone and | Shade on polyacrylonitrile |
| --- | --- |
| dimethylaniline | bluish red |
| diethylaniline | " |
| N-methyl-N-β-cyanoethylaniline | strongly bluish red |
| N-ethyl-N-β-hydroxyethylaniline | " |
| di-n-propylaniline | " |
| N-ethyl-N-benzylaniline | " |
| 3-methoxy-N,N-diethylaniline | dull red |
| 3-methyl-N,N-dimethylaniline | bluish Bordeaux |

| Dyestuff from 4-methoxybenzophenone and | Shade on polyacrylonitrile |
| --- | --- |
| 3-methyl-N-ethyl-N-benzylaniline | reddish violet |
| N-butyl-N-β-chloroethylaniline | ruby |
| 2-methyl-N,N-dimethylaniline | bluish red |
| N,N-diisopropylaniline | red |
| N-methyldiphenylamine | reddish violet |
| 1-dimethylaminonaphthalene | bluish red |
| N-ethyl-N-dimethylaminoethylaniline | bluish pink |
| N,N-di-β-chloroethylaniline | strongly bluish red |
| N-ethyl-N-β-chloroethylaniline | " |
| N-methyl-2-methylaniline | red |
| N-ethyl-2-methylaniline | yellowish red |
| N-isobutylaniline | red |
| N-butyl-3-methylaniline | bluish Bordeaux |
| N-benzyl-2-methylaniline | bluish red |
| N-β-cyanoethyl-2-ethoxyaniline | ruby |
| N-β-cyanoethyl-2-methylaniline | red |
| N-β-cyanoethyl-2-ethylaniline | red |
| N-phenylmorpholine | ruby |
| 1,2,3,3-tetramethylindoline | red |
| 1-phenyl-3-methylpyrazoline | reddish violet |
| 1,3-diphenylpyrazoline | reddish blue |

| Dyestuff from 4-ethoxybenzophenone and | Shade on polyacrylonitrile |
| --- | --- |
| dimethylaniline | bluish red |
| diethylaniline | bluish red |
| N-methyl-N-β-cyanoethylaniline | strongly bluish red |
| N-ethyl-N-β-hydroxyethylaniline | strongly bluish red |
| 3-methyl-N-ethyl-N-β-chloroethylaniline | red-violet |
| 3-methyl-N-ethyl-N-β-cyanoethylaniline | reddish violet |
| di-n-propylaniline | bluish red |
| N-ethyl-N-benzylaniline | ruby |
| 3-methoxy-N,N-diethylaniline | bluish red |
| 3-methyl-N,N-dimethylaniline | strongly bluish red |
| N,N-diisopropylaniline | red |
| N-methyldiphenylamine | red-violet |
| N-methyl-N-4-ethoxyphenylaniline | reddish violet |
| 1-dimethylaminonaphthalene | strongly bluish red |
| 2-ethoxy-N-β-cyanoethylaniline | ruby |
| 2-methyl-N-β-cyanoethylaniline | bluish red |
| N-phenylmorpholine | ruby |
| 1,2,3,3-tetramethylindoline | bluish red |
| 1-phenyl-3-methylpyrazoline | reddish violet |

| Dyestuff from 4-phenoxybenzophenone and | Shade on polyacrylonitrile |
| --- | --- |
| dimethylaniline | yellowish red |
| 3-methyl-N,N-dimethylaniline | reddish Bordeaux |
| N-methyl-N-4-ethoxyphenylaniline | reddish violet |
| 2-methoxy-N-cyanoethylaniline | bluish red |
| 1,2,3,3-tetramethylindoline | yellowish red |
| 1-phenyl-3-methylpyrazoline | strongly bluish Bordeaux |

| Dyestuff from 2-methyl-4-methoxybenzophenone and | Shade on polyacrylonitrile |
| --- | --- |
| dimethylaniline | strongly yellowish red |
| diethylaniline | strongly yellowish red |
| di-n-propylaniline | yellowish red |
| N-methyl-N-β-hydroxyethylaniline | red |
| N-ethyl-N-β-hydroxyethylaniline | red |
| N-butyl-N-β-chloroethylaniline | red |
| N-methyl-N-β-cyanoethylaniline | red |
| N-ethyl-N-benzylaniline | red |
| 3-methyl-N,N-dimethylaniline | Bordeaux, reddish |
| 3-methyl-N-ethyl-N-benzylaniline | Bordeaux |
| 3-methyl-N-ethyl-N-β-cyanoethylaniline | Bordeaux |
| 3-methoxy-N,N-diethylaniline | strongly yellowish red |
| 2-methyl-N-methylaniline | yellowish scarlet |
| 2-methyl-N-ethylaniline | yellowish scarlet |
| 2-methyl-N-cyanoethylaniline | strongly yellowish red |
| N-β-hydroxyethylaniline | yellowish red |
| 2-methyl-N-benzylaniline | strongly yellowish red |
| 2-ethyl-N-β-cyanoethylaniline | yellowish red |
| 2,3-dimethyl-N-β-cyanoethyltetrahydroquinoline | ruby |
| 1,2,3,3-tetramethylindoline | reddish orange |
| N-phenylmorpholine | strongly yellowish red |
| | red |

| Dyestuff from 2-methyl-4-methoxybenzophenone and | Shade on polyacrylonitrile |
| --- | --- |
| 1-phenyl-3-methylpyrazoline | Bordeaux |
| 1,3-diphenylpyrazoline | strongly reddish blue |
| N-ethyl-N-β-dimethylamino-ethylaniline | bluish red |
| N-n-propyl-o-toluidine | yellowish scarlet |
| N-i-propyl-o-toluidine | yellowish scarlet |
| N-n-butyl-o-toluidine | strongly yellowish red |
| α-anilino-isobutyric acid-methylester | strongly yellowish red |

| Dyestuff from 2-methyl-4-ethoxybenzophenone and | Shade on polyacrylonitrile |
| --- | --- |
| dimethylaniline | yellowish red |
| diethylaniline | " |
| di-n-propylaniline | red |
| N-methyl-N-β-cyanoethylaniline | somewhat bluish red |
| N-methyl-N-β-hydroxyethylaniline | red |
| N-ethyl-N-benzylaniline | yellowish red |
| 3-methoxy-N,N-diethylaniline | strongly yellowish red |
| 2-methyl-N-methylaniline | scarlet |
| 2-methyl-N-ethylaniline | scarlet |
| 2-methyl-N-β-cyanoethylaniline | bluish scarlet |
| N-isobutylaniline | reddish orange |
| 2-ethyl-N-β-cyanoethylaniline | strongly yellowish red |
| 2-methyl-N-benzylaniline | scarlet |
| 1,2,3,3-tetramethylindoline | strongly yellowish red |
| N-phenylmorpholine | red |
| α-anilino-isobutyric acid-methylester | clear somewhat yellowish red |

| Dyestuff from 2-methyl-4-butoxybenzophenone and | Shade on Polyacrylonitrile |
| --- | --- |
| dimethylaniline | yellowish red |
| diethylaniline | " |
| di-n-propylaniline | red |
| N-methyl-N-β-cyanoethylaniline | bluish red |
| N-methyl-N-β-hydroxyethylaniline | red |
| N-ethyl-N-benzylaniline | somewhat bluish red |
| 2-methyl-N-methylaniline | reddish orange |
| 2-methyl-N-ethylaniline | yellowish scarlet |
| 2-methyl-N-β-cyanoethylaniline | strongly yellowish red |
| 2-ethyl-N-β-cyanoethylaniline | yellowish red |
| N-isobutylaniline | strongly yellowish red |
| 1,2,3,3-tetramethylindoline | strongly yellowish red |
| N-phenylmorpholine | red |
| 3-ethoxy-N,N-diethylaniline | strongly yellowish red |

| Dyestuff from 2,4-dimethoxybenzophenone and | Shade on polyacrylonitrile |
| --- | --- |
| dimethylaniline | bluish red |
| di-n-propylaniline | strongly bluish red |
| N-methyl-N-β-cyanoethylaniline | Bordeaux |
| N-methyl-N-β-hydroxyethylaniline | bluish red |
| 3-methyl-N,N-dimethylaniline | strongly bluish red |
| 2-methyl-N-ethylaniline | red |
| 2-methyl-N-β-cyanoethylaniline | bluish red |
| 2-methyl-N-benzylaniline | strongly bluish red |
| 1,2,3,3-tetramethylindoline | red |
| N-phenylmorpholine | Bordeaux |
| 1,3-diphenylpyrazoline | reddish dark-blue |

| Dyestuff from 4-methoxy-2'-chlorobenzophenone and | Shade on polyacrylonitrile |
| --- | --- |
| dimethylaniline | yellowish red |
| diethylaniline | yellowish red |
| N-ethyl-N-chloroethylaniline | red |
| N-butyl-N-β-chloroethylaniline | somewhat bluish red |
| N-methyldiphenylamine | red-violet |
| 3-methyl-N,N-dimethylaniline | reddish Bordeaux |
| 3-methyl-N-ethylaniline | bluish red |
| di-n-propylaniline | bluish red |
| N-methyl-N-β-hydroxyethylaniline | bluish red |
| N-methyl-N-β-cyanoethylaniline | strongly bluish red |
| 3-ethoxy-N,N-diethylaniline | red |
| N-ethyl-N-benzylaniline | strongly bluish red |
| N-butylaniline | scarlet |

-continued

| Dyestuff from 4-methoxy-2'-chloro-benzophenone and | Shade on polyacrylonitrile |
|---|---|
| N-isobutylaniline | strongly yellowish red |
| N-β-cyanoethylaniline | yellowish red |
| 2-methyl-N-methylaniline | strongly yellowish red |
| 2-methyl-N-ethylaniline | strongly yellowish red |
| 2-methyl-N-β-cyanoethylaniline | bluish red |
| 2-ethyl-N-β-cyanoethylaniline | red |
| 2-methyl-N-benzylaniline | red |
| 1,2,3,3-tetramethylindoline | strongly yellowish red |
| N-phenylmorpholine | strongly bluish red |
| 1,3-diphenylpyrazoline | bluish violet |
| 1-phenyl-3-methylpyrazoline | bluish Bordeaux |
| α-anilino-isobutyric acid-methylester | clear red |
| N-n-butyl-o-toluidine | strongly yellowish red |
| N-ethyl-2-chloroaniline | strongly bluish red |
| N-ethyl-o-anisidine | red |

| Dyestuff from 4-ethoxy-2'-chloro-benzophenone and | Shade on polyacrylonitrile |
|---|---|
| dimethylaniline | red |
| diethylaniline | bluish red |
| di-n-propylaniline | " |
| N-methyl-N-β-hydroxyethylaniline | strongly bluish red |
| N-methyl-N-β-cyanoethylaniline | " |
| N-ethyl-N-benzylaniline | " |
| 3-ethoxy-N,N-diethylaniline | strongly yellowish red |
| N-butylaniline | strongly yellowish red |
| N-isobutylaniline | strongly yellowish red |
| N-β-cyanoethylaniline | red |
| 2-methyl-N-methylaniline | strongly yellowish red |
| 2-methyl-N-ethylaniline | strongly yellowish red |
| 2-methyl-N-benzylaniline | bluish red |
| 2-methyl-N-β-cyanoethylaniline | red |
| 2-ethyl-N-β-cyanoethylaniline | " |
| 1,2,3,3-tetramethylindoline | strongly yellowish red |
| N-phenylmorpholine | strongly bluish red |
| 1,3-diphenylpyrazoline | strongly bluish violet |
| 1-phenyl-3-methylpyrazoline | Bordeaux |

| Dyestuff from 4-methoxy-4'-chloro-benzophenone and | Shade on polyacrylonitrile |
|---|---|
| dimethylaniline | bluish red |
| diethylaniline | " |

| Dyestuff from 4-methoxy-2',5'-dichlorobenzophenone and | Shade on polyacrylonitrile |
|---|---|
| dimethylaniline | yellowish red |
| diethylaniline | yellowish red |

| Dyestuff from 4-methoxy-2'-bromo-benzophenone and | Shade on polyacrylonitrile |
|---|---|
| dimethylaniline | yellowish red |
| diethylaniline | yellowish red |
| N-methyl-N-β-chloroethylaniline | somewhat bluish red |

| Dyestuff from 4-methoxy-2'-methyl-benzophenone and | Shade on polyacrylonitrile |
|---|---|
| dimethylaniline | yellowish red |
| diethylaniline | yellowish red |
| di-n-propylaniline | red |
| N-methyl-N-β-cyanoethylaniline | bluish red |
| N-methyl-N-β-hydroxyethylaniline | bluish red |
| N-butyl-N-β-chloroethylaniline | bluish red |
| N-ethyl-N-benzylaniline | bluish red |
| 3-methyl-N,N-dimethylaniline | Bordeaux |
| 3-methyl-N-ethyl-N-β-chloroethyl-aniline | bluish Bordeaux |
| 3-methyl-N-ethyl-N-β-cyanoethylaniline | bluish Bordeaux |
| diphenylamine | red-violet |
| 3-ethoxy-N,N-diethylaniline | strongly yellowish red |
| N-n-butylaniline | yellowish scarlet |
| N-isobutylaniline | scarlet |

| Dyestuff from 4-methoxy-2'-methyl-benzophenone and | Shade on polyacrylonitrile |
|---|---|
| N-benzylaniline | scarlet |
| 2-methyl-N-methylaniline | scarlet |
| 2-methyl-N-ethylaniline | scarlet |
| 2-methyl-N-benzylaniline | strongly bluish scarlet |
| 2-methyl-N-β-cyanoethylaniline | bluish scarlet |
| di-n-propylaniline | red |
| N-ethyl-N-β-dimethylamino-ethyl-aniline | strongly bluish red |
| n-butylaniline | clear strongly yellowish red |
| isobutylaniline | strongly yellowish red |
| N-cyanoethylaniline | somewhat yellowish red |
| N-methyl-o-toluidine | clear strongly yellowish red |
| N-ethyl-o-toluidine | clear strongly yellowish red |
| N-n-butyl-o-toluidine | strongly yellowish red |
| N-cyanoethyl-o-toluidine | red |
| N-cyanoethyl-2-ethylaniline | red |

| Dyestuff from 4-methoxy-2'-methyl-benzophenone and | Shade on polyacrylonitrile |
|---|---|
| 2-ethyl-N-β-cyanoethylaniline | bluish scarlet |
| 2,5-dimethyl-N-β-cyanoethylaniline | bluish Bordeaux |
| 2-methyl-2,3-dihydroindole | yellowish scarlet |
| 1,2,3,3-tetramethylindoline | strongly yellowish red |
| N-phenylmorpholine | bluish red |
| 1-phenyl-3-methylpyrazoline | strongly bluish Bordeaux |
| 1,3-diphenylpyrazoline | reddish blue |
| N-methyldiphenylamine | bluish ruby |
| N-methyl-4-ethoxyphenylaniline | strongly bluish Bordeaux |
| N-ethyl-N-β-dimethylamino-ethyl-aniline | bluish pink |
| N-n-propyl-o-toluidine | yellowish red |
| N-i-propyl-o-toluidine | strongly yellowish red |
| N-n-butyl-o-toluidine | strongly yellowish red |
| N-ethyl-2-ethylaniline | strongly yellowish red |
| α-anilino-isobutyric acid-methylester | clear red |
| N-ethyl-2-chloroaniline | bluish red |
| N-ethyl-o-anisidine | red |
| N-cyanoethyl-o-anisidine | ruby |
| 2-methylaminobenzoic acid-methylester | red |
| N-n-butyl-m-phenetidine | strongly yellowish red |

| Dyestuff from 4-ethoxy-2'-methyl-benzophenone and | Shade on polyacrylonitrile |
|---|---|
| dimethylaniline | yellowish red |
| diethylaniline | yellowish red |
| di-n-propylaniline | somewhat bluish red |
| N-methyl-N-β-cyanoethylaniline | strongly bluish red |
| N-methyl-N-β-hydroxyethylaniline | strongly bluish red |
| N-butyl-N-β-chloroethylaniline | strongly bluish red |
| N-ethyl-N-benzylaniline | strongly bluish red |
| 3-methyl-N,N-dimethylaniline | bluish ruby |
| 3-methyl-N-ethyl-N-β-chloroethyl-aniline | bluish Bordeaux |
| 3-methyl-N-ethyl-N-β-cyanoethyl-aniline | bluish Bordeaux |
| 3-ethoxy-N,N-diethylaniline | strongly yellowish red |
| N-n-butylaniline | scarlet |
| N-benzylaniline | bluish scarlet |
| 2-methyl-N-methylaniline | scarlet |
| 2-methyl-N-ethylaniline | scarlet |
| 2-methyl-N-benzylaniline | red |
| 2-methyl-N-β-cyanoethylaniline | red |
| 2-ethyl-N-β-cyanoethylaniline | red |
| 2,5-dimethyl-N-β-cyanoethylaniline | bluish ruby |
| 2-methyl-2,3-dihydroindole | reddish orange |
| 1,2,3,3-tetramethylindoline | strongly yellowish red |
| N-phenylmorpholine | strongly bluish red |
| 1-phenyl-3-methylpyrazoline | strongly bluish Bordeaux |
| 1,3-diphenylpyrazoline | strongly reddish violet |
| N-methyldiphenylamine | bluish Bordeaux |
| N-ethyl-N-β-dimethylaminoethyl-aniline | strongly bluish red |
| N-i-propyl-o-toluidine | yellowish red |
| N-ethyl-2-ethylaniline | yellowish red |
| α-anilino-isobutyric acid-methylester | clear red |
| N-ethyl-o-anisidine | bluish red |

| Dyestuff from 4-ethoxy-2'-methyl-benzophenone and | Shade on polyacrylonitrile |
|---|---|
| N-cyanoethyl-o-anisidine | Bordeaux |
| 2-methylaminobenzoic acid-methylester | red |
| N-n-butyl-m-phenetidine | strongly yellowish red |

| Dyestuff from 4-n-propoxy-2'-methyl-benzophenone and | Shade on polyacrylonitrile |
|---|---|
| dimethylaniline | bluish red |
| diethylaniline | bluish red |
| di-n-propylaniline | bluish red |
| N-methyl-N-β-cyanoethylaniline | strongly bluish red |
| N-methyl-N-β-hydroxyethylaniline | strongly bluish red |
| 3-ethoxy-N,N-diethylaniline | strongly yellowish red |
| N-n-butylaniline | scarlet |
| N-isobutylaniline | bluish scarlet |
| N-β-hydroxyethylaniline | bluish red |
| N-benzylaniline | yellowish red |
| 2-methyl-N-methylaniline | bluish scarlet |
| 2-methyl-N-ethylaniline | red |
| 2-methyl-N-cyanoethylaniline | bluish red |
| 2-ethyl-N-β-cyanoethylaniline | bluish red |
| 2-methyl-N-benzylaniline | scarlet |
| 2-methyl-2,3-dihydroindole | yellowish scarlet |
| 1,2,3,3-tetramethylindoline | yellowish red |
| N-phenylmorpholine | strongly bluish red |
| 1-phenyl-3-methylpyrazoline | red-violet |
| 1,3-diphenylpyrazoline | reddish blue |
| N-n-butyl-o-toluidine | yellowish red |
| N-ethyl-2-ethylaniline | somewhat yellowish red |
| N-ethyl-2-chloroaniline | strongly bluish red |
| α-anilino-isobutyric acid-methylester | clear somewhat bluish red |

| Dyestuff from 4-isopropoxy-2'-methylbenzophenone and | Shade on polyacrylonitrile |
|---|---|
| dimethylaniline | yellowish red |
| diethylaniline | reddish orange |
| di-n-propylaniline | red |
| 2-methyl-N-methylaniline | yellowish orange |
| 2-methyl-N-ethylaniline | orange |

| Dyestuff from 4-n-butoxy-2'-methylbenzophenone and | Shade on polyacrylonitrile |
|---|---|
| dimethylaniline | bluish red |
| diethylaniline | bluish red |
| di-n-propylaniline | bluish red |
| N-methyl-N-β-hydroxyethylaniline | strongly bluish red |
| N-methyl-N-β-cyanoethylaniline | strongly bluish red |
| 3-ethoxy-N,N-diethylaniline | yellowish red |
| N-n-butylaniline | scarlet |
| N-isobutylaniline | scarlet |
| N-benzylaniline | bluish scarlet |
| 2-methyl-N-methylaniline | strongly yellowish red |
| 2-methyl-N-ethylaniline | scarlet |
| 2-methyl-N-β-cyanoethylaniline | bluish red |
| 2-ethyl-N-β-cyanoethylaniline | bluish red |
| 2-methyl-N-benzylaniline | bluish red |
| 2-methyl-2,3-dihydroindole | yellowish scarlet |
| 1,2,3,3-tetramethylindoline | yellowish red |
| N-phenylmorpholine | strongly bluish red |
| 1-phenyl-3-methylpyrazoline | red-violet |
| 1,3-diphenylpyrazoline | bluish violet |
| N-n-butyl-o-toluidine | yellowish red |
| N-ethyl-2-chloroaniline | strongly bluish red |
| α-anilino-isobutyric acid-methylester | somewhat bluish red |

| Dyestuff from 4-methoxy-3'-methyl-benzophenone and | Shade on polyacrylonitrile |
|---|---|
| dimethylaniline | bluish red |
| diethylaniline | bluish red |
| di-n-propylaniline | bluish red |
| N-methyl-N-β-hydroxyethylaniline | bluish red |
| N-methyl-N-β-cyanoethylaniline | strongly bluish red |
| 2-methyl-N-methylaniline | yellowish red |
| 2-methyl-N-ethylaniline | yellowish red |

| Dyestuff from 4-methoxy-3'-methyl-benzophenone and | Shade on polyacrylonitrile |
|---|---|
| 2-methyl-N-benzylaniline | red |
| 2-methyl-N-β-cyanoethylaniline | red |
| 2-ethyl-N-β-cyanoethylaniline | red |
| 2,5-dimethyl-N-β-cyanoethylaniline | bluish Bordeaux |
| 1,2,3,3-tetramethylindoline | red |
| N-phenylmorpholine | strongly bluish red |
| 1,3-diphenylpyrazoline | strongly bluish red |
| N-isopropyl-o-toluidine | red |
| N-ethyl-2-ethylaniline | red |
| α-anilino-isobutyric acid-methylester | clear bluish red |
| N-ethyl-o-anisidine | Bordeaux |

| Dyestuff from 4-ethoxy-3'-methyl-benzophenone and | Shade on polyacrylonitrile |
|---|---|
| dimethylaniline | bluish red |
| diethylaniline | bluish red |
| di-n-propylaniline | strongly bluish red |
| N-methyl-N-β-cyanoethylaniline | strongly bluish red |
| N-methyl-N-β-hydroxyethylaniline | strongly bluish red |
| 2-methyl-N-methylaniline | yellowish red |
| 2-methyl-N-ethylaniline | yellowish red |
| 2-methyl-N-benzylaniline | bluish red |
| 2-methyl-N-β-cyanoethylaniline | red |
| 2-ethyl-N-β-cyanoethylaniline | bluish red |
| 2,3-dimethyl-N-β-cyanoethylaniline | bluish red |
| 1,2,3,3-tetramethylindoline | bluish red |
| N-phenylmorpholine | strongly bluish red |
| 1,3-diphenylpyrazoline | bluish red |
| N-isopropyl-o-toluidine | red |
| α-anilino-isobutyric acid-methylester | clear bluish red |

| Dyestuff from 4-methoxy-4'-methyl-benzophenone and | Shade on polyacrylonitrile |
|---|---|
| 2-ethyl-N-β-cyanoethylaniline | red |
| 2,3-dimethyl-N-β-cyanoethylaniline | strongly bluish Bordeaux |
| 2-methyl-N-β-cyanoethylaniline | bluish red |
| N-phenylmorpholine | bluish ruby |
| 1,2,3,3-tetramethylindoline | red-Bordeaux |
| α-anilino-isobutyric acid-methylester | clear bluish red |
| N-ethyl-o-anisidine | ruby |

| Dyestuff from 4-methoxy-2',4'-dimethylbenzophenone and | Shade on polyacrylonitrile |
|---|---|
| dimethylaniline | red |
| diethylaniline | red |
| N-ethyl-N-β-chloroethylaniline | Bordeaux |
| N,N-di-β-chloroethylaniline | bluish red |
| N-ethyl-N-benzylaniline | bluish red |
| N-methyldiphenylamine | bluish Bordeaux |
| N-methyl-N-4-ethoxyphenylaniline | strongly bluish Bordeaux |
| 3-methyl-N,N-dimethylaniline | bluish red |
| N,N-di-n-propylaniline | bluish red |
| N-methyl-N-β-hydroxyethylaniline | bluish red |
| N-methyl-N-β-cyanoethylaniline | strongly bluish red |
| 3-ethoxy-N,N-diethylaniline | yellowish red |
| 2-methyl-N-methylaniline | scarlet |
| 2-methyl-N-ethylaniline | bluish scarlet |
| 2-methyl-N-β-cyanoethylaniline | red |
| N-n-butylaniline | yellowish scarlet |
| N-isobutylaniline | strongly yellowish red |
| 2-methyl-N-benzylaniline | yellowish red |
| 2-ethyl-N-β-cyanoethylaniline | red |
| 1,2,3,3-tetramethylindoline | yellowish red |
| N-phenylmorpholine | bluish red |

| Dyestuff from 4-methoxy-3',4'-dimethylbenzophenone and | Shade on polyacrylonitrile |
|---|---|
| dimethylaniline | bluish red |
| diethylaniline | bluish red |
| N-ethyl-N-β-chloroethylaniline | bluish red |
| N-butyl-N-β-chloroethylaniline | bluish red |
| N-methyldiphenylamine | strongly bluish Bordeaux |

| Dyestuff from 4-methoxy-3',4'-dimethylbenzophenone and | Shade on polyacrylonitrile |
|---|---|
| 3-methyl-N,N-dimethylaniline | bluish Bordeaux |
| 2-ethyl-N-β-cyanoethylaniline | red |
| 2,3-dimethyl-N-β-cyanoethylaniline | bluish Bordeaux |
| 2-methyl-N-methylaniline | red |
| 2-methyl-N-ethylaniline | red |
| 2-methyl-N-β-cyanoethylaniline | red |
| N-isobutylaniline | red |
| 1,2,3,3-tetramethylindoline | bluish red |
| α-anilino-isobutyric acid-methylester | clear red |

| Dyestuff from 4-methoxy-2',5'-dimethylbenzophenone and | Shade on polyacrylonitrile |
|---|---|
| dimethylaniline | yellowish red |
| diethylaniline | yellowish red |
| N-ethyl-N-β-chloroethylaniline | red |
| N-methyldiphenylamine | bluish Bordeaux |
| N-methyl-N-4-ethoxyphenylaniline | red-violet |
| 3-methyl-N,N-dimethylaniline | reddish Bordeaux |

| Dyestuff from 4-methoxy-2',4',5'-trimethylbenzophenone and | Shade on polyacrylonitrile |
|---|---|
| dimethylaniline | red |
| diethylaniline | red |
| N-ethyl-N-β-chloroethylaniline | bluish red |
| N-isobutylaniline | strongly yellowish red |
| 2-methyl-N-methylaniline | strongly yellowish red |
| 2-methyl-N-ethylaniline | strongly yellowish red |
| 2-methyl-N-β-cyanoethylaniline | red |
| 2-methyl-N-benzylaniline | red |
| 2-ethyl-N-β-cyanoethylaniline | yellowish red |
| 2,3-dimethyl-N-β-cyanoethylaniline | bluish ruby |
| 2,5-dimethyl-N-β-cyanoethylaniline | Bordeaux |
| tetrahydroquinoline | strongly yellowish red |
| 2-methyl-2,3-dihydroindole | strongly yellowish red |
| 1,2,3,3-tetramethylindoline | yellowish red |
| 1,3-diphenylpyrazoline | reddish blue |
| di-n-propylaniline | bluish red |
| N-ethyl-N-β-dimethylamino-ethyl-aniline | bluish red |
| N-n-propyl-o-toluidine | yellowish red |
| N-i-propyl-o-toluidine | yellowish red |
| N-n-butyl-o-toluidine | somewhat yellowish red |
| N-ethyl-2-ethylaniline | scarlet |
| α-anilino-isobutyric acid-methylester | strongly bluish scarlet |
| N-ethyl-o-anisidine | strongly bluish red |
| 2-methylaminobenzoic acid-methylester | red |

| Dyestuff from 4-methoxy-diethyl-benzophenone and | Shade on polyacrylonitrile |
|---|---|
| dimethylaniline | bluish red |
| diethylaniline | bluish red |
| di-n-propylaniline | bluish red |
| N-methyl-N-β-cyanoethylaniline | strongly bluish red |
| N-methyl-N-β-hydroxyethylaniline | bluish red |
| N-n-butyl-N-β-chloroethylaniline | ruby |
| N-ethyl-N-benzylaniline | strongly bluish red |
| 3-ethoxy-N,N-diethylaniline | strongly yellowish red |
| N-isobutylaniline | strongly yellowish red |
| N-benzylaniline | yellowish red |
| 2-methyl-N-methylaniline | strongly yellowish red |
| 2-methyl-N-ethylaniline | strongly yellowish red |
| 2-methyl-N-β-cyanoethylaniline | yellowish red |
| 2-ethyl-N-β-cyanoethylaniline | yellowish red |
| 2-methyl-N-benzylaniline | red |
| 1,2,3,3-tetramethylindoline | yellowish red |
| N-phenylmorpholine | bluish red |

| Dyestuff from 4-methoxy-2',4'-diisopropylbenzophenone and | Shade on polyacrylonitrile |
|---|---|
| dimethylaniline | red |
| diethylaniline | red |
| di-n-propylaniline | bluish red |
| N-methyl-N-β-chloroethylaniline | bluish red |
| N-ethyl-N-β-chloroethylaniline | bluish red |
| N-butyl-N-β-chloroethylaniline | strongly bluish red |
| 5-methyl-N-ethyl-N-β-chloroethylaniline | bluish Bordeaux |
| 2-methyl-N-methylaniline | strongly yellowish red |
| 2-methyl-N-β-cyanoethylaniline | red |

| Dyestuff from 4-methoxy-2',5'-diisopropylbenzophenone and | Shade on polyacrylonitrile |
|---|---|
| dimethylaniline | red |
| diethylaniline | bluish red |

| Dyestuff from 4-methoxy-4'-tert.-butylbenzophenone and | Shade on polyacrylonitrile |
|---|---|
| dimethylaniline | bluish red |
| diethylaniline | strongly bluish red |
| di-n-propylaniline | ruby |
| N-methyl-N-β-cyanoethylaniline | strongly bluish red |
| N-methyl-N-β-hydroxyethylaniline | ruby |
| N-n-butyl-N-β-chloroethylaniline | ruby |
| N-ethyl-N-benzylaniline | strongly bluish red |
| 3-ethoxy-N,N-diethylaniline | red-Bordeaux |
| 2-methyl-N-methylaniline | bluish red |
| 2-methyl-N-ethylaniline | red |
| 2-methyl-N-β-cyanoethylaniline | bluish red |
| N-n-butylaniline | yellowish red |
| N-isobutylaniline | yellowish red |
| N-benzylaniline | yellowish red |
| 2-methyl-N-benzylaniline | red |
| 2-ethyl-N-β-cyanoethylaniline | red |
| 1,2,3,3-tetramethylindoline | bluish red |

| Dyestuff from 2-methyl-4-methoxy-2'-chlorobenzophenone and | Shade on polyacrylonitrile |
|---|---|
| dimethylaniline | yellowish red |
| diethylaniline | yellowish red |
| N-methyl-N-β-chloroethylaniline | red |
| N-ethyl-N-β-chloroethylaniline | yellowish red |
| N-butyl-N-β-chloroethylaniline | red |
| 3-methyl-N,N-dimethylaniline | yellowish red |

| Dyestuff from 2-methyl-4-methoxy-2'-bromobenzophenone and | Shade on polyacrylonitrile |
|---|---|
| dimethylaniline | strongly yellowish red |
| diethylaniline | yellowish red |
| N-ethyl-N-β-chloroethylaniline | yellowish red |
| 3-methyl-N-ethyl-N-β-chloroethyl-aniline | red-Bordeaux |
| 3-methyl-N,N-dimethylaniline | yellowish red |

| Dyestuff from 2,2'-dimethyl-4-methoxybenzophenone and | Shade on polyacrylonitrile |
|---|---|
| dimethylaniline | strongly yellowish red |
| diethylaniline | strongly yellowish red |
| di-n-propylaniline | strongly yellowish red |
| N-methyl-N-β-hydroxyethylaniline | red |
| N-methyl-N-β-cyanoethylaniline | bluish red |
| 2-methyl-N-methylaniline | reddish orange |
| 2-methyl-N-ethylaniline | reddish orange |
| 2-methyl-N-β-cyanoethylaniline | scarlet |
| 2-ethyl-N-β-cyanoethylaniline | bluish scarlet |
| 2,5-dimethyl-N-β-cyanoethylaniline | strongly bluish red |
| 2-methyl-N-benzylaniline | scarlet |
| 1,2,3,3-tetramethylindoline | strongly reddish orange |
| N-phenylmorpholine | red |
| 1-phenyl-2-methylpyrazoline | bluish ruby |
| 1,3-diphenylpyrazoline | strongly reddish blue |
| N-methyldiphenylamine | bluish ruby |

| Dyestuff from 2,3'-dimethyl-4-methoxybenzophenone and | Shade on polyacrylonitrile |
|---|---|
| dimethylaniline | strongly yellowish red |
| diethylaniline | yellowish red |
| di-n-propylaniline | yellowish red |
| N-methyl-N-β-cyanoethylaniline | red |
| N-methyl-N-β-hydroxyethylaniline | red |
| 2-methyl-N-methylaniline | yellowish scarlet |
| 2-methyl-N-ethylaniline | yellowish scarlet |
| 2-methyl-N-benzylaniline | scarlet |
| 2-methyl-N-β-cyanoethylaniline | scarlet |
| 2-ethyl-N-β-cyanoethylaniline | bluish scarlet |
| 2,5-dimethyl-N-β-cyanoethylaniline | strongly bluish red |
| 1,2,3,3-tetramethylindoline | strongly yellowish red |
| N-phenylmorpholine | bluish red |
| 1-phenyl-3-methylpyrazoline | bluish ruby |
| 1,3-diphenylpyrazoline | strongly reddish dark-blue |
| N-methyldiphenylamine | Bordeaux |

| Dyestuff from 2,4'-dimethyl-4-methoxybenzophenone and | Shade on polyacrylonitrile |
|---|---|
| dimethylaniline | yellowish red |
| diethylaniline | red |
| N-methyl-N-β-chloroethylaniline | red |
| N-n-butyl-N-β-chloroethylaniline | red |
| 3-methyl-N-ethyl-N-β-chloroethylaniline | Bordeaux |
| di-n-propylaniline | red |
| 2-methyl-N-methylaniline | yellowish scarlet |
| 2-methyl-N-ethylaniline | strongly yellowish red |
| 2-methyl-N-benzylaniline | yellowish red |
| 2-methyl-N-β-cyanoethylaniline | yellowish red |
| 2-ethyl-N-β-cyanoethylaniline | bluish scarlet |
| 2,5-dimethyl-N-β-cyanoethylaniline | strongly bluish red |
| 1,2,3,3-tetramethylindoline | yellowish red |
| N-phenylmorpholine | bluish ruby |
| 1-phenyl-3-methylpyrazoline | bluish Bordeaux |
| 1,3-diphenylpyrazoline | strongly reddish blue |

| Dyestuff from 2-methyl-4-methoxy-4'-tert.-butylbenzophenone and | Shade on polyacrylonitrile |
|---|---|
| dimethylaniline | red |
| diethylaniline | red |
| di-n-propylaniline | bluish red |
| N-methyl-N-β-cyanoethylaniline | bluish red |
| N-methyl-N-β-hydroxyethylaniline | bluish red |
| 3-ethoxy-N,N-diethylaniline | yellowish red |
| 2-methyl-N-methylaniline | scarlet |
| 2-methyl-N-ethylaniline | scarlet |
| 2-methyl-N-β-cyanoethylaniline | bluish scarlet |
| N-n-butylaniline | yellowish scarlet |
| N-isobutylaniline | yellowish scarlet |
| 2-ethyl-N-β-cyanoethylaniline | strongly yellowish red |
| 2-methyl-N-benzylaniline | scarlet |

| Dyestuff from 4-ethoxy-2',4'-dimethylbenzophenone and | Shade on polyacrylonitrile |
|---|---|
| dimethylaniline | bluish red |
| diethylaniline | red |
| di-n-propylaniline | bluish red |
| 2-methyl-N-methylaniline | strongly yellowish red |
| 2-methyl-N-ethylaniline | strongly yellowish red |
| 2-methyl-N-benzylaniline | yellowish red |
| 2-methyl-N-β-cyanoethylaniline | red |
| 2-ethyl-N-β-cyanoethylaniline | yellowish red |
| N-n-butylaniline | strongly yellowish red |
| N-isobutylaniline | strongly yellowish red |
| α-anilino-isobutyric acid-methylester | clear red |

| Dyestuff from 4-ethoxy-2',4',5'-trimethylbenzophenone and | Shade on polyacrylonitrile |
|---|---|
| dimethylaniline | red |
| diethylaniline | red |
| di-n-propylaniline | bluish red |
| 2-methyl-N-methylaniline | strongly yellowish red |
| 2-methyl-N-ethylaniline | strongly yellowish red |
| 2-methyl-N-β-cyanoethylaniline | yellowish red |

| Dyestuff from 4-ethoxy-4'-tert.-butylbenzophenone and | Shade on polyacrylonitrile |
|---|---|
| dimethylaniline | strongly bluish red |
| diethylaniline | strongly bluish red |
| di-n-propylaniline | strongly bluish red |
| N-isobutylaniline | yellowish red |
| 2-methyl-N-methylaniline | bluish red |
| 2-methyl-N-ethylaniline | red |
| 2-methyl-N-β-cyanoethylaniline | red |
| N-methyl-N-β-hydroxyethylaniline | strongly bluish red |
| N-methyl-N-β-cyanoethylaniline | strongly bluish red |
| 1,2,3,3-tetramethylindoline | bluish red |
| N-phenylmorpholine | ruby |
| 1,3-diphenylpyrazoline | reddish blue |
| α-anilino-isobutyric acid-methylester | bluish red |

| Dyestuff from 2,4-dimethoxy-2'-chlorobenzophenone and | Shade on polyacrylonitrile |
|---|---|
| dimethylaniline | bluish red |
| diethylaniline | strongly bluish red |
| N-methyl-N-β-chloroethylaniline | reddish Bordeaux |
| N-ethyl-N-β-chloroethylaniline | reddish Bordeaux |
| N-butyl-N-β-chloroethylaniline | Bordeaux |
| 3-chloro-N,N-dimethylaniline | currant-grey |
| 3-methyl-N,N-dimethylaniline | bluish Bordeaux |

| Dyestuff from 2,4-dimethoxy-4'-chlorobenzophenone and | Shade on polyacrylonitrile |
|---|---|
| dimethylaniline | bluish red |
| diethylaniline | red-Bordeaux |
| N-ethyl-N-β-chloroethylaniline | reddish Bordeaux |

| Dyestuff from 2,4-dimethoxy-2',5'-dichlorobenzophenone and | Shade on polyacrylonitrile |
|---|---|
| dimethylaniline | red-Bordeaux |
| diethylaniline | red-Bordeaux |
| N-ethyl-N-β-chloroethylaniline | reddish Bordeaux |

| Dyestuff from 2,4-dimethoxy-2'-bromobenzophenone and | Shade on polyacrylonitrile |
|---|---|
| dimethylaniline | reddish Bordeaux |
| diethylaniline | reddish Bordeaux |
| N-methyl-N-β-chloroethylaniline | bluish ruby |
| N-ethyl-N-β-chloroethylaniline | Bordeaux |

| Dyestuff from 2,4-dimethoxy-3'-methylbenzophenone and | Shade on polyacrylonitrile |
|---|---|
| dimethylaniline | strongly bluish red |
| diethylaniline | strongly bluish red |
| di-n-propylaniline | strongly bluish red |
| N-methyl-N-β-cyanoethylaniline | Bordeaux |
| 2-methyl-N-β-cyanoethylaniline | strongly bluish red |
| 2-methyl-N-benzylaniline | bluish red |
| 1,2,3,3-tetramethylindoline | red |
| N-phenylmorpholine | red |
| 1,3-diphenylpyrazoline | reddish blue |

| Dyestuff from 4-methoxy-4'-phenoxybenzophenone and | Shade on polyacrylonitrile |
|---|---|
| dimethylaniline | dull red |

| Dyestuff from 4-ethoxy-2',4',5'-trimethylbenzophenone and | Shade on polyacrylonitrile |
|---|---|
| 2-methyl-N-β-cyanoethylaniline | yellowish red |

-continued

| Dyestuff from 4-methoxy-4'-phenoxybenzophenone and | Shade on polyacrylonitrile |
|---|---|
| diethylaniline | dull red |
| di-n-propylaniline | reddish Bordeaux |
| 3-chloro-N,N-diethylaniline | reddish grey |
| 3-ethoxy-N,N-diethylaniline | bluish red |
| 3-methyl-N,N-dimethylaniline | strongly bluish Bordeaux |
| 2-methyl-N-β-cyanoethylaniline | red |
| 2-ethoxy-N-β-cyanoethylaniline | Bordeaux |

| Dyestuff from 2,4'-dimethoxybenzophenone and | Shade on polyacrylonitrile |
|---|---|
| dimethylaniline | red |
| diethylaniline | bluish red |
| di-n-propylaniline | bluish red |
| di-n-butylaniline | bluish red |
| N-methyl-N-βhydroxyethylaniline | bluish red |
| N-methyl-N-β-cyanoethylaniline | strongly bluish red |
| N-butyl-N-β-chloroethylaniline | bluish red |
| N-methyl-N-benzylaniline | red-Bordeaux |
| N-ethyl-N-benzylaniline | red-Bordeaux |
| N,N-dibenzylaniline | strongly bluish Bordeaux |
| N-phenylmorpholine | red-Bordeaux |
| 3-chloro-N,N-diethylaniline | bluish violet |
| 3-ethoxy-N,N-diethylaniline | yellowish red |
| N,N-diisopropylaniline | yellowish red |
| N-methyl-N-isopropylaniline | red |
| N-methyl-N-isobutylaniline | bluish red |
| N-ethyl-N-isopropylaniline | bluish red |
| N-isopropyl-N-isobutylaniline | red-Bordeaux |
| N-methyl-N-ethylaniline | yellowish red |
| N-methyl-N-propylaniline | bluish red |
| N-ethyl-N-propylaniline | bluish red |
| N-propyl-N-isopropylaniline | bluish red |
| 2-methyl-N-methylaniline | yellowish red |
| 2-methyl-N-β-cyanoethylaniline | bluish red |
| 2-ethyl-N-β-cyanoethylaniline | red |
| 2,5-dimethyl-N-β-cyanoethylaniline | bluish ruby |
| 2-methyl-N-benzylaniline | red |
| 1,2,3,3-tetramethylindoline | yellowish red |
| 1-phenyl-3-methylpyrazoline | strongly bluish Bordeaux |
| 1,3-diphenylpyrazoline | reddish blue |

| Dyestuff from 2-methoxy-4'-ethoxybenzophenone and | Shade on polyacrylonitrile |
|---|---|
| dimethylaniline | bluish red |
| diethylaniline | bluish red |
| di-n-propylaniline | bluish red |
| di-n-butylaniline | strongly bluish red |
| N-methyl-N-β-hydroxyethylaniline | bluish red |
| N,N-diisopropylaniline | red |
| N-methyl-N-isopropylaniline | bluish red |
| N-methyl-N-isobutylaniline | bluish red |
| N-ethyl-N-isopropylaniline | bluish red |
| N-isopropyl-N-isobutylaniline | strongly bluish red |
| N-methyl-N-ethylaniline | bluish red |
| N-methyl-N-propylaniline | bluish red |
| N-ethyl-N-propylaniline | strongly bluish red |
| N-propyl-N-isopropylaniline | strongly bluish red |
| N-phenylmorpholine | strongly bluish red |
| 1,2,3,3-tetramethylindoline | red |
| 1,3-diphenylpyrazoline | reddish blue |
| 2-methyl-N-ethylaniline | yellowish red |
| 2-methyl-N-β-cyanoethylaniline | bluish red |

| Dyestuff from 2-methoxy-4'-propoxybenzophenone and | Shade on polyacrylonitrile |
|---|---|
| dimethylaniline | red |
| diethylaniline | bluish red |
| di-n-propylaniline | bluish red |
| di-n-butylaniline | strongly bluish red |
| N-methyl-N-β-hydroxyethylaniline | bluish red |
| N-methyl-N-isopropylaniline | bluish red |
| N-ethyl-N-isopropylaniline | bluish red |
| N-isopropyl-N-isobutylaniline | strongly bluish red |
| N-methyl-N-ethylaniline | red |
| N-methyl-N-propylaniline | bluish red |
| N-ethyl-N-propylaniline | bluish red |

| Dyestuff from 2-methoxy-4'-propoxybenzophenone and | Shade on polyacrylonitrile |
|---|---|
| N-propyl-N-isopropylaniline | bluish red |

| Dyestuff from 2,4'-dimethoxy-2'-chlorobenzophenone and | Shade on polyacrylonitrile |
|---|---|
| dimethylaniline | reddish brown |
| diethylaniline | yellow-brown |
| di-n-propylaniline | yellow-brown |
| di-n-butylaniline | yellow-brown |
| N-methyl-N-β-hydroxyethylaniline | yellowish brick-red |
| N-methyl-N-isobutylaniline | orange-brown |

| Dyestuff from 2,4'-dimethoxy-3'-chlorobenzophenone and | Shade on polyacrylonitrile |
|---|---|
| dimethylaniline | yellowish red |
| diethylaniline | yellowish red |
| di-n-propylaniline | yellowish red |
| di-n-butylaniline | yellowish red |
| N-methyl-N-β-hydroxyethylaniline | red |
| N,N-diisopropylaniline | yellowish scarlet |
| N-methyl-N-isopropylaniline | yellowish red |
| N-methyl-N-isobutylaniline | yellowish red |
| N-methyl-N-ethylaniline | yellowish red |
| N-methyl-N-propylaniline | yellowish red |
| N-ethyl-N-propylaniline | yellowish red |
| N-propyl-N-isopropylaniline | yellowish red |

| Dyestuff from 2,4'-dimethoxy-2'-methylbenzophenone and | Shade on polyacrylonitrile |
|---|---|
| dimethylaniline | strongly yellowish red |
| diethylaniline | yellowish red |
| di-n-propylaniline | yellowish red |
| di-n-butylaniline | red |
| N-methyl-N-β-hydroxyethylaniline | red |
| N-methyl-N-isopropylaniline | yellowish red |
| N-ethyl-N-isopropylaniline | yellowish red |
| N-propyl-N-isopropylaniline | yellowish red |
| N-methyl-N-ethylanine | yellowish red |
| N-propyl-N-methylaniline | yellowish red |
| N-ethyl-N-propylaniline | yellowish red |
| N-isopropyl-N-isobutylaniline | red |
| N-methyl-N-isobutylaniline | yellowish red |
| 2-methyl-N-methylaniline | yellowish scarlet |
| 2-methyl-N-ethylaniline | yellowish scarlet |
| 2-methyl-N-β-cyanoethylaniline | red |
| 2-methyl-N-benzylaniline | yellowish red |
| N-methyl-N-β-cyanoethylaniline | bluish red |

| Dyestuff from 2,4'-dimethoxy-3'-methylbenzophenone and | Shade on polyacrylonitrile |
|---|---|
| dimethylaniline | bluish red |
| diethylaniline | bluish red |
| di-n-propylaniline | bluish red |
| di-n-butylaniline | strongly bluish red |
| N-methyl-N-β-hydroxyethylaniline | strongly bluish red |
| N,N-diisopropylaniline | red |

| Dyestuff from 2,4'-dimethoxy-5-methylbenzophenone and | Shade on polyacrylonitrile |
|---|---|
| dimethylaniline | red |
| diethylaniline | bluish red |
| di-n-propylaniline | red-Bordeaux |

| Dyestuff from 2,4'-dimethoxy-2'-methyl-5'-chlorobenzophenone and | Shade on polyacrylonitrile |
|---|---|
| dimethylaniline | strongly yellowish red |
| diethylaniline | yellowish scarlet |

-continued

| Dyestuff from 2,4'-dimethoxy-2'-methyl-5'-chlorobenzophenone and | Shade on polyacrylonitrile |
|---|---|
| di-n-propylaniline | strongly yellowish red |
| di-n-butylaniline | strongly yellowish red |
| N-methyl-N-β-hydroxyethylaniline | yellowish red |
| N,N-diisopropylaniline | reddish orange |
| N-methyl-N-isopropylaniline | strongly yellowish red |
| N-ethyl-N-isopropylaniline | strongly yellowish red |
| N-propyl-N-isopropylaniline | strongly yellowish red |
| N-methyl-N-ethylaniline | strongly yellowish red |
| N-methyl-N-propylaniline | strongly yellowish red |
| N-ethyl-N-propylaniline | strongly yellowish red |
| N-methyl-N-isobutylaniline | strongly yellowish red |
| N-isopropyl-N-isobutylaniline | yellowish red |

| Dyestuff from 2,4'-dimethoxy-2'-chloro-5'-methylbenzophenone and | Shade on polyacrylonitrile |
|---|---|
| dimethylaniline | yellowish brick-red |
| diethylaniline | yellow-brown |
| di-n-butylaniline | red-brown |
| N-methyl-N-β-hydroxyethylaniline | strongly yellowish red |
| N-methyl-N-isopropylaniline | yellowish brick-red |
| N-methyl-N-isobutylaniline | brick-red |

| Dyestuff from 2,4'-dimethoxy-4,6-dimethylbenzophenone and | Shade on polyacrylonitrile |
|---|---|
| dimethylaniline | red |
| diethylaniline | red |
| di-n-propylaniline | yellowish Bordeaux |
| N-methyl-N-β-hydroxyethylaniline | bluish red |
| N-methyl-N-β-cyanoethylaniline | strongly bluish red |
| N,N-diisopropylaniline | strongly yellowish red |
| N-methyl-N-isopropylaniline | red |
| N-methyl-N-isobutylaniline | red |
| N-ethyl-N-isopropylaniline | red |
| N-isopropyl-N-isobutylaniline | bluish red |

| Dyestuff from 2,4'-dimethoxy-2'-chloro-3'-methylbenzophenone and | Shade on polyacrylonitrile |
|---|---|
| dimethylaniline | strongly yellowish brick red |
| diethylaniline | yellowish brick-red |
| di-n-propylaniline | brick-red |
| di-n-butylaniline | brick-red |
| N-methyl-N-β-hydroxyethylaniline | yellowish red |
| N-methyl-N-β-cyanoethylaniline | red |
| N-methyl-N-benzylaniline | bluish red |
| 3-ethoxy-N,N-diethylaniline | reddish orange |
| N,N-diisopropylaniline | reddish orange |
| N-methyl-N-isobutylaniline | strongly yellowish red |

| Dyestuff from 3,4'-dimethoxybenzophenone and | Shade on polyacrylonitrile |
|---|---|
| dimethylaniline | bluish red |
| diethylaniline | bluish red |
| di-n-propylaniline | red-Bordeaux |
| di-n-butylaniline | red-Bordeaux |
| N-methyl-N-β-hydroxyethylaniline | bluish red |
| N,N-di-β-hydroxyethylaniline | bluish red |
| N-methyl-N-βcyanoethylaniline | strongly bluish red |
| N-butyl-N-β-chloroethylaniline | strongly bluish red |
| N-methyl-N-benzylaniline | red-Bordeaux |
| N-ethyl-N-benzylaniline | strongly bluish red |
| N,N-dibenzylaniline | ruby |
| N-methyldiphenylamine | bluish Bordeaux |
| N-methyl-N-4-ethoxyphenylaniline | strongly bluish Bordeaux |
| N-phenylmorpholine | strongly bluish red |
| 3-methyl-N-ethyl-N-benzylaniline | strongly bluish Bordeaux |
| 3-ethoxy-N,N-diethylaniline | red |
| N-methyl-N-β-methoxyethylaniline | bluish red |
| N-methyl-N-isopropylaniline | bluish red |
| N-ethyl-N-isopropylaniline | bluish red |
| N-propyl-N-isopropylaniline | bluish red |
| N-methyl-N-ethylaniline | bluish red |
| N-methyl-N-propylaniline | bluish red |
| N-ethyl-N-propylaniline | red-Bordeaux |
| N-methyl-N-isobutylaniline | bluish red |

| Dyestuff from 3,4'-dimethoxybenzophenone and | Shade on polyacrylonitrile |
|---|---|
| N-isopropyl-N-isobutylaniline | strongly bluish red |
| N-n-butylaniline | strongly yellowish red |
| N-isobutylaniline | strongly yellowish red |
| N-β-cyanoethylaniline | red |
| 2-methyl-N-methylaniline | strongly yellowish red |
| 2-methyl-N-ethylaniline | yellowish red |
| 2-methyl-N-β-cyanoethylaniline | bluish red |
| 2-ethyl-N-β-cyanoethylaniline | red |
| 2-methyl-N-benzylaniline | red |
| 1,2,3,3-tetramethylindoline | red |
| α-anilino-isobutyric acid-methylester | strongly bluish red |

| Dyestuff from 3-methoxy-4'-ethoxybenzophenone and | Shade on polyacrylonitrile |
|---|---|
| dimethylaniline | bluish red |
| diethylaniline | bluish red |
| di-n-propylaniline | strongly bluish red |
| di-n-butylaniline | strongly bluish red |
| N-methyl-N-β-hydroxyethylaniline | bluish red |
| N,N-diisopropylaniline | red |
| N-methyl-N-isopropylaniline | bluish red |
| N-ethyl-N-isopropylaniline | bluish red |
| N-propyl-N-isopropylaniline | strongly bluish red |
| N-methyl-N-ethylaniline | bluish red |
| N-methyl-N-propylaniline | bluish red |
| N-ethyl-N-propylaniline | strongly bluish red |
| N-methyl-N-isobutylaniline | red-Bordeaux |
| N-isopropyl-N-isobutylaniline | strongly bluish red |
| 2-methyl-N-methylaniline | yellowish red |
| 2-methyl-N-ethylaniline | red |
| 2-methyl-N-β-cyanoethylaniline | bluish red |
| 2-ethyl-N-β-cyanoethylaniline | bluish red |
| 1,2,3,3-tetramethylindoline | bluish red |

| Dyestuff from 3-methoxy-4'-propoxybenzophenone and | Shade on polyacrylonitrile |
|---|---|
| dimethylaniline | bluish red |
| diethylaniline | bluish red |
| di-n-propylaniline | bluish red |
| di-n-butylaniline | strongly bluish red |
| N-methyl-N-β-hydroxyethylaniline | bluish red |
| N,N-di-β-hydroxyethylaniline | strongly bluish red |
| N-butyl-N-β-chloroethylaniline | strongly bluish red |
| N-methyl-N-isopropylaniline | bluish red |
| N-ethyl-N-isopropylaniline | strongly bluish red |
| N-propyl-N-isopropylaniline | strongly bluish red |
| N-methyl-N-ethylaniline | bluish red |
| N-methyl-N-propylaniline | bluish red |
| N-ethyl-N-propylaniline | bluish red |
| N-methyl-N-isobutylaniline | bluish red |
| N-isopropyl-N-isobutylaniline | strongly bluish red |

| Dyestuff from 3,4'-dimethoxy-2'-methylbenzophenone and | Shade on polyacrylonitrile |
|---|---|
| dimethylaniline | strongly yellowish red |
| diethylaniline | yellowish red |
| di-n-propylaniline | yellowish red |
| di-n-butylaniline | yellowish red |
| N-methyl-N-β-hydroxyethylaniline | bluish red |
| N-methyl-N-isopropylaniline | strongly yellowish red |
| N-methyl-N-ethylaniline | yellowish red |
| N-propyl-N-methylaniline | yellowish red |
| N-ethyl-N-propylaniline | yellowish red |
| N-propyl-N-isopropylaniline | yellowish red |
| 2-methyl-N-methylaniline | reddish orange |
| 2-methyl-N-ethylaniline | reddish orange |
| 2-methyl-N-β-cyanoethylaniline | strongly yellowish red |
| 2-ethyl-N-β-cyanoethylaniline | yellowish red |
| 1,2,3,3-tetramethylindoline | reddish orange |

| Dyestuff from 2,5,4'-trimethoxybenzophenone and | Shade on polyacrylonitrile |
|---|---|
| dimethylaniline | bluish red |
| diethylaniline | bluish red |

-continued

| Dyestuff from 2,5,4'-trimethoxy-benzophenone and | Shade on polyacrylonitrile |
|---|---|
| di-n-propylaniline | strongly bluish red |
| di-n-butylaniline | strongly bluish red |
| N-methyl-N-β-hydroxyethylaniline | strongly bluish red |
| N,N-diisopropylaniline | yellowish red |

| Dyestuff from 3,4,3'-trimethoxy-benzophenone and | Shade on polyacrylonitrile |
|---|---|
| dimethylaniline | bluish red |
| diethylaniline | bluish red |

| Dyestuff from 3,4,2'-trimethoxy-benzophenone and | Shade on polyacrylonitrile |
|---|---|
| dimethylaniline | strongly bluish red |
| diethylaniline | strongly bluish red |
| di-n-propylaniline | strongly bluish red |
| di-n-butylaniline | ruby |
| N-methyl-N-β-hydroxyethylaniline | ruby |
| N-methyl-N-isopropylaniline | strongly bluish red |

| Dyestuff from 2-methoxy-1-(4'-methoxy-benzoyl)-naphthalene and | Shade on polyacrylonitrile |
|---|---|
| dimethylaniline | red-Bordeaux |
| diethylaniline | red-Bordeaux |
| di-n-propylaniline | reddish Bordeaux |
| 2-methyl-N-β-cyanoethylaniline | red-Bordeaux |

| Dyestuff from 2-ethoxy-1-(4'-methoxy-benzoyl)-naphthalene and | Shade on polyacrylonitrile |
|---|---|
| dimethylaniline | reddish Bordeaux |
| diethylaniline | reddish Bordeaux |
| di-n-propylaniline | Bordeaux |

| Dyestuff from 2-butoxy-1-('-methoxy-benzoyl)-naphthalene and | Shade on polyacrylonitrile |
|---|---|
| dimethylaniline | reddish Bordeaux |
| diethylaniline | reddish Bordeaux |
| di-n-propylaniline | Bordeaux |

| Dyestuff from 2-methyl-4-n-propoxy-benzophenone and | Shade on polyacrylonitrile |
|---|---|
| dimethylaniline | yellowish red |
| diethylaniline | strongly yellowish red |
| N-methyl-2-methylaniline | strongly yellowish red |
| N-ethyl-2-methylaniline | scarlet |
| di-n-propylaniline | yellowish red |
| N-cyanoethyl-2-methylaniline | yellowish red |
| N-methyl-N-β-cyanoethylaniline | bluish red |
| 3-ethoxy-N-,N-diethylaniline | strongly yellowish red |
| 2-methyl-N-benzylaniline | strongly yellowish red |
| N-methyl-N-β-hydroxyethylaniline | bluish red |

| Dyestuff from 3,4-dimethoxybenzo-phenone and | Shade on polyacrylonitrile |
|---|---|
| N-isobutylaniline | yellowish red |
| 2-methyl-N-benzylaniline | bluish red |
| N-phenylmorpholine | strongly bluish red |
| N-cyanoethylaniline | bluish red |

| Dyestuff from 3,4-dimethoxy-2'-methylbenzophenone and | Shade on polyacrylonitrile |
|---|---|
| dimethylaniline | strongly bluish red |
| diethylaniline | strongly bluish red |
| di-n-propylaniline | strongly bluish red |
| 2-methyl-N-methylaniline | red |
| 2-methyl-N-ethylaniline | bluish red |
| n-butylaniline | red |
| isobutylaniline | somewhat bluish red |

| Dyestuff from 4-methoxy-2',5'-dimethylbenzophenone and | Shade on polyacrylonitrile |
|---|---|
| di-n-propylaniline | bluish red |
| N-methyl-N-β-cyanoethylaniline | strongly bluish red |
| N-n-butyl-N-β-chloroethylaniline | ruby |
| N-methyl-N-β-hydroxyethylaniline | bluish red |
| N-n-butylaniline | reddish orange |
| N-isobutylaniline | strongly yellowish red |
| 2-methyl-N-methylaniline | strongly yellowish red |
| 2-methyl-N-ethylaniline | strongly yellowish red |
| 2-methyl-N-β-cyanoethylaniline | yellowish red |
| 2-methyl-N-benzylaniline | yellowish red |
| 2-ethyl-N-β-cyanoethylaniline | red |
| 1,2,3,3-tetramethylindoline | yellowish brick-red |
| N-phenylmorpholine | strongly bluish red |

| Dyestuff from 2-methyl-4-methoxy-2'-chlorobenzophenone and | Shade on polyacrylonitrile |
|---|---|
| di-n-propylaniline | yellowish red |
| 3-ethoxy-N,N-diethylaniline | reddish orange |
| 2-methyl-N-methylaniline | reddish orange |
| 2-methyl-N-ethylaniline | strongly yellowish red |
| 2-methyl-N-β-cyanoethylaniline | yellowish red |
| 2-methyl-N-benzylaniline | yellowish red |
| N-n-butylaniline | strongly reddish orange |
| N-isobutylaniline | reddish orange |

| Dyestuff from 3,4'-dimethoxy-3'-bromobenzophenone and | Shade on polyacrylonitrile |
|---|---|
| dimethylaniline | bluish red |
| diethylaniline | bluish red |
| di-n-propylaniline | strongly bluish red |
| diisopropylaniline | bluish red |
| di-n-butylaniline | strongly bluish red |
| N-methyl-N-ethylaniline | bluish red |
| N-methyl-N-propylaniline | bluish red |
| N-ethyl-N-propylaniline | bluish red |

| Dyestuff from 2,4-dimethoxy-3'-methylbenzophenone and | Shade on polyacrylonitride |
|---|---|
| dimethylaniline | strongly bluish red |
| diethylaniline | strongly bluish red |
| di-n-propylaniline | strongly bluish red |
| N-methyl-N-βcyanoethylaniline | Bordeaux |
| 2-methyl-N-β-cyanoethylaniline | strongly bluish red |
| 2-methyl-N-benzylaniline | bluish red |
| 1,2,3,3-tetramethylindoline | red |
| N-phenylmorpholine | red |
| 1,3-diphenylpyrazoline | reddish blue |

| Dyestuff from 4,4'-dimethoxy-benzophenone and | Shade on polyacrylonitrile |
|---|---|
| diethylaniline | red-Bordeaux |
| N-methyldiphenylamine | strongly bluish Bordeaux |
| N-methyl-N-4-ethoxyphenyl-aniline | currant-blue |
| 3-methyl-N-ethyl-N-chloroethyl-aniline | currant |
| di-n-propylaniline | strongly bluish red |
| di-n-butylaniline | reddish Bordeaux |
| N-methyl-N-hydroxyethylaniline | bluish red |

-continued

| Dyestuff from 4,4'-dimethoxy-benzophenone and | Shade on polyacrylonitrile |
|---|---|
| N-butyl-N-hydroxyethylaniline | strongly bluish red |
| N,N-dihydroxyethylaniline | strongly bluish red |
| N-methyl-N-β-cyanoethylaniline | bluish red |
| N-butyl-N-β-chloroethylaniline | strongly bluish red |
| N-ethyl-N-dimethylaminoethylaniline | strongly bluish red |
| N,N-bis-α,β-dihydroxyethylaniline | strongly bluish red |
| N-methyl-N-benzylaniline | strongly bluish red |
| N-ethyl-N-benzylaniline | bluish red |
| N,N-dibenzylaniline | strongly bluish red |
| N-phenylmorpholine | Bordeaux |
| 3-methyl-N,N-dimethylaniline | currant |
| 3-chloro-N,N-dimethylaniline | currant-blue |
| 3-chloro-N,N-diethylaniline | reddish black |
| 3-methyl-N-ethyl-N-benzylaniline | currant-blue |
| 3-methyl-N-ethyl-N-β-hydroxyethylaniline | currant |
| 3-methyl-N,N-di-β-hydroxyethylaniline | currant |
| 3-ethoxy-N,N-diethylaniline | Bordeaux |
| 1-dimethylaminonaphthalene | bluish Bordeaux |
| 1-diethylaminonaphthalene | strongly bluish Bordeaux |
| N,N-diisopropylaniline | red |
| 3-methoxy-N,N-diethylaniline | reddish Bordeaux |
| N-methyl-N-β-methoxyethylaniline | red-Bordeaux |
| N,N-di-β-methoxyethylaniline | red-Bordeaux |
| N-methyl-N-isobutylaniline | red-Bordeaux |
| N-methyl-N-isopropylaniline | bluish red |
| N-ethyl-N-isopropylaniline | strongly bluish red |
| N-isopropyl-N-isobutylaniline | Bordeaux |
| 2-methyl-N-methylaniline | bluish red |
| 2-methyl-N-ethylaniline | red |
| N-n-butylaniline | bluish red |
| N-isobutylaniline | yellowish red |
| 2-methyl-N-benzylaniline | red |
| N-β-cyanoethylaniline | red |
| 2-methyl-N-β-cyanoethylaniline | red |
| N-benzylaniline | yellowish red |
| 2-ethyl-N-β-cyanoethylaniline | red |
| 2,3-dimethyl-N-β-cyanoethylaniline | Bordeaux |
| 2,5-dimethyl-N-β-cyanoethylaniline | Bordeaux |
| 2-ethoxy-N-β-cyanoethylanaline | Bordeaux |
| 2-hydroxy-N-β-cyanoethylaniline | Bordeaux |
| 2-methyl-2,3-dihydroindole | red |
| 1,2,3,3-tetramethylindoline | strongly bluish red |
| 1-phenyl-3-methylpyrazoline | currant-blue |
| 1,3-diphenylpyrazoline | dark-blue |
| N-methyl-N-ethylaniline | bluish red |
| N-methyl-N-propylaniline | bluish red |
| N-ethyl-N-propylaniline | bluish red |
| N-propyl-N-isopropylaniline | bluish red |
| α-anilino-isobutyric acid-methylester | strongly bluish scarlet |
| N-n-propyl-o-toluidine | somewhat bluish red |
| N-i-propyl-o-toluidine | bluish red |
| N-n-butyl-o-toluidine | somewhat bluish red |
| N-ethyl-2-ethylaniline | red |
| N-ethyl-2-chloroaniline | red |
| N-ethyl-o-anisidine | bluish Bordeaux |

| Dyestuff from 4-methoxy 4'-ethoxybenzophenone and | Shade on polyacrylonitrile |
|---|---|
| dimethylaniline | red-Bordeaux |
| diethylaniline | red-Bordeaux |
| di-n-propylaniline | reddish Bordeaux |
| di-n-butylaniline | reddish Bordeaux |
| N-methyl-N-βhydroxyethylaniline | bluish red |
| N-methyl-N-β-cyanoethylaniline | bluish red |
| N-butyl-N-β-chloroethylaniline | strongly bluish red |
| 3-ethoxy-N,N-diethylaniline | red-Bordeaux |
| N,N-diisopropylaniline | red |
| N-methyl-N-isopropylaniline | red-Bordeax |
| N-methyl-N-isobutylaniline | red-Bordeaux |
| N-ethyl-N-isopropylaniline | reddish Bordeaux |
| N-isopropyl-N-isobutylaniline | Bordeaux |
| 2-methyl-N-methylaniline | bluish red |
| 2-methyl-N-ethylaniline | red |
| N-isobutylaniline | |
| 2-methyl-N-β-cyanoethylaniline | yellowish red |
| N-n-butylaniline | bluish red |
| N-benzylaniline | yellowish red |
| 2-methyl-N-benzylaniline | red |
| 2-ethyl-N-β-cyanoethylaniline | yellowish red |
| 2,3-dimethyl-N-β-cyanoethylaniline | Bordeaux |
| N-phenylmorpholine | reddish Bordeaux |
| 1,2,3,3-tetramethylindoline | red-Bordeaux |
| N-methyl-N-ethylaniline | red-Bordeaux |
| N-ethyl-N-propylaniline | red-Bordeaux |
| N-methyl-N-propylaniline | red-Bordeaux |
| N-propyl-N-isopropylaniline | red-Bordeaux |
| N-n-butyl-o-toluidine | somewhat bluish red |

| Dyestuff from 4-methoxy-4'-n-propoxybenzophenone and | Shade on polyacrylonitrile |
|---|---|
| dimethylaniline | bluish red |
| diethylaniline | bluish red |
| di-n-propylaniline | bluish red |
| di-n-butylaniline | bluish red |
| diisopropylaniline | bluish red |
| N-methyl-N-isopropylaniline | strongly bluish red |
| N-methyl-N-isobutylaniline | red-Bordeaux |
| N-ethyl-N-isopropylaniline | bluish red |
| N-isopropyl-N-isobutylaniline | Bordeaux |
| N-methyl-N-ethylaniline | bluish red |
| N-ethyl-N-propylaniline | bluish red |
| N-methyl-N-propylaniline | bluish red |
| N-propyl-N-isopropylaniline | strongly bluish red |

| Dyestuff from 4-methoxy-4'-isopropoxybenzophenone and | Shade on polyacrylonitrile |
|---|---|
| dimethylaniline | bluish red |
| diethylaniline | strongly bluish red |
| di-n-propylaniline | strongly bluish red |
| di-n-butylaniline | red-Bordeaux |
| N-methyl-N-β-cyanoethylaniline | bluish red |
| N,N-diisopropylaniline | red |
| N,N-di-β-methoxyethylaniline | red-Bordeaux |
| N-methyl-N-isopropylaniline | bluish red |
| N-methyl-N-isobutylaniline | bluish red |
| N-ethyl-N-isopropylaniline | strongly bluish red |
| N-isopropyl-N-isobutylaniline | strongly bluish red |
| N-methyl-N-ethylaniline | strongly bluish red |
| N-methyl-N-propylaniline | strongly bluish red |
| N-ethyl-N-propylaniline | strongly bluish red |
| N-propyl-N-isopropylaniline | reddish Bordeaux |

| Dyestuff from 4-methoxy-4'-n-butoxybenzophenone and | Shade on polyacrylonitrile |
|---|---|
| dimethylaniline | bluish red |
| diethylaniline | bluish red |
| di-n-propylaniline | strongly bluish red |
| di-n-butylaniline | ruby |
| N-methyl-N-βhydroxyethylaniline | bluish red |
| N,N-diisopropylaniline | bluish red |
| N-methyl-N-isopropylaniline | bluish red |
| N-methyl-N-isobutylaniline | red-Bordeaux |
| N-ethyl-N-isopropylaniline | strongly bluish red |
| N-isopropyl-N-isobutylaniline | reddish Bordeaux |
| N-methyl-N-ethylaniline | bluish red |
| N-methyl-N-propylaniline | bluish red |
| N-ethyl-N-propylaniline | strongly bluish red |
| N-propyl-N-isopropylaniline | reddish Bordeaux |
| isobutylaniline | somewhat bluish red |
| N-methyl-o-toluidine | somewhat bluish red |
| N-ethyl-o-toluidine | somewhat bluish red |

| Dyestuff from 4-methoxy-4'-phenoxybenzophenone and | Shade on polyacrylonitrile |
|---|---|
| dimethylaniline | dull red |
| diethylaniline | " |
| di-n-propylaniline | reddish Bordeaux |
| 3-chloro-N,N-diethylaniline | reddish grey |
| 3-ethoxy-N,N-diethylaniline | bluish red |
| 3-methyl-N,N-dimethylaniline | strongly bluish Bordeaux |
| 2-methyl-N-β-cyanoethylaniline | red |

-continued

| Dyestuff from 4-methoxy-4'-phenoxybenzophenone and | Shade on polyacrylonitrile |
|---|---|
| 2-ethoxy-N-β-cyanoethylaniline | Bordeaux |

| Dyestuff from 4,4'-diethoxy-benzophenone and | Shade on polyacrylonitrile |
|---|---|
| dimethylaniline | strongly bluish red |
| diethylaniline | " |
| N-methyl-N-β-hydroxyethylaniline | red-Bordeaux |
| N-butyl-N-β-hydroxyethylaniline | strongly bluish red |
| N,N-di-β-hydroxyethylaniline | red-Bordeaux |
| N-butyl-N-β-chloroethylaniline | reddish Bordeaux |
| N-methyldiphenylamine | strongly bluish Bordeaux |
| N-methyl-N-4-ethoxyphenylaniline | currant-grey |
| N-methyl-N-isopropylaniline | reddish Bordeaux |
| N-methyl-N-isobutylaniline | very strongly bluish red |
| N-ethyl-N-isopropylaniline | reddish Bordeaux |
| N-isopropyl-N-isobutylaniline | " |
| N-methyl-N-ethylaniline | strongly bluish red |
| N-methyl-N-propylaniline | " |
| N-ethyl-N-propylaniline | " |
| N-propyl-N-isopropylaniline | reddish Bordeaux |
| 3-ethoxy-N,N-diethylaniline | " |
| 2-methyl-N-methylaniline | bluish red |
| 2-methyl-N-ethylaniline | red |
| N-isobutylaniline | " |
| 2-methyl-N-β-cyanoethylaniline | " |
| N-n-butylaniline | bluish red |
| N-benzylaniline | yellowish red |
| 2-methyl-N-benzylaniline | red |
| 2-ethyl-N-β-cyanoethylaniline | yellowish red |
| 2,3-dimethyl-N-β-cyanoethylaniline | Bordeaux |
| N-phenylmorpholine | Bordeaux |
| 1,2,3,3-tetramethylindoline | ruby |

| Dyestuff from 4-ethoxy-4'-propoxybenzophenone and | Shade on polyacrylonitrile |
|---|---|
| 2-methyl-N-methylaniline | red |
| 2-methyl-N-ethylaniline | " |
| N-isobutylaniline | " |
| N-β-cyanoethylaniline | " |
| 2-methyl-N-β-cyanoethylaniline | " |

| Dyestuff from 4,4'-di-n-propoxy-benzophenone and | Shade on polyacrylonitrile |
|---|---|
| dimethylaniline | bluish red |
| 3-chloro-N,N-diethylaniline | grey |
| 2-methyl-N-β-cyanoethylaniline | red |

| Dyestuff from 4,4'-di-n-butoxy-benzophenone and | Shade on polyacrylonitrile |
|---|---|
| dimethylaniline | bluish red |
| diethylaniline | strongly bluish red |
| di-n-propylaniline | Bordeaux |

| Dyestuff from 4,4'-dimethoxy-2-chlorobenzophenone and | Shade on polyacrylonitrile |
|---|---|
| Dimethylaniline | red |
| diethylaniline | " |
| di-n-propylaniline | bluish red |
| di-n-butylaniline | " |
| N-methyl-N-β-hydroxyethylaniline | " |
| N,N-di-β-hydroxyethylaniline | " |
| N-methyl-N-β-cyanoethylaniline | " |
| N-butyl-N-β-chloroethylaniline | " |
| N-methyl-N-benzylaniline | " |
| N-ethyl-N-benzylaniline | " |
| N,N-dibenzylaniline | strongly bluish red |
| N-methyldiphenylamine | bluish Bordeaux |
| N-methyl-N-4-ethoxyphenylaniline | strongly bluish Bordeaux |
| N-phenylmorpholine | bluish red |
| 3-ethoxy-N,N-diethylaniline | yellowish red |

| Dyestuff from 4,4'-dimethoxy-2-chlorobenzophenone and | Shade on polyacrylonitrile |
|---|---|
| N,N-diisopropylaniline | " |
| N-methyl-N-β-methoxyethylaniline | bluish red |
| N-methyl-N-isopropylaniline | red |
| N-methyl-N-isobutylaniline | bluish red |
| N-ethyl-N-isopropylaniline | " |
| N-isopropyl-N-isobutylaniline | red-Bordeaux |
| N-methyl-N-ethylaniline | red |
| N-methyl-N-propylaniline | bluish red |
| N-ethyl-N-propylaniline | " |
| N-propyl-N-isopropylaniline | " |
| isobutylaniline | somewhat yellowish red |
| N-methyl-o-toluidine | " |
| N-ethyl-o-toluidine | " |
| N-cyanoethyl-o-toluidine | red |
| 1,2,3,3-tetramethylindoline | " |

| Dyestuff from 4,4'-dimethoxy-3-chlorobenzophenone and | Shade on polyacrylonitrile |
|---|---|
| dimethylaniline | bluish red |
| diethylaniline | " |
| di-n-propylaniline | strongly bluish red |
| di-n-butylaniline | " |
| N-methyl-N-β-hydroxyethylaniline | bluish red |
| N,N-di-β-hydroxyethylaniline | strongly bluish red |
| N-butyl-N-β-chloroethylaniline | " |
| N-methyl-N-benzylaniline | strongly bluish red |
| N-phenylmorpholine | " |
| 3-ethoxy-N,N-diethylaniline | bluish red |
| N,N-diisopropylaniline | red |
| N-methyl-N-β-methoxyethylaniline | strongly bluish red |
| N-methyl-N-isopropylaniline | bluish red |
| N-methyl-N-isobutylaniline | strongly bluish red |
| N-ethyl-N-isopropylaniline | " |
| N-isopropyl-N-isobutylaniline | reddish Bordeaux |
| N-methyl-N-ethylaniline | bluish red |
| N-methyl-N-propylaniline | " |
| N-ethyl-N-propylaniline | strongly bluish red |
| N-propyl-N-isopropylaniline | " |

| Dyestuff from 4,4'-dimethoxy-3,3'-dichlorobenzophenone and | Shade on polyacrylonitrile |
|---|---|
| dimethylaniline | bluish red |
| diethylaniline | strongly bluish red |

| Dyestuff from 4,4'-dimethoxy-2-methylbenzophenone and | Shade on polyacrylonitrile |
|---|---|
| dimethylaniline | red |
| diethylaniline | bluish red |
| di-n-propylaniline | 41 |
| di-n-butylaniline | " |
| N-methyl-N-β-hydroxyethylaniline | " |
| N,N-di-β-hydroxyethylaniline | " |
| N-methyl-N-β-cyanoethylaniline | red |
| N-butyl-N-β-chloroethylaniline | bluish red |
| N-methyl-N-benzylaniline | " |
| N-ethyl-N-benzylaniline | bluish red |
| N,N-dibenzylaniline | " |
| N-phenylmorpholine | " |
| 3-methyl-N-ethyl-N-hydroxyethylaniline | strongly bluish Bordeaux |
| 3-ethoxy-N,N-diethylaniline | yellowish red |
| N,N-diisopropylaniline | " |
| N-methyl-N-β-methoxyethylaniline | bluish red |
| N,N-β-methoxyethylaniline | " |
| N-methyl-N-isopropylaniline | red |
| N-methyl-N-isobutylaniline | bluish red |
| N-ethyl-N-isopropylaniline | " |
| N-isopropyl-N-isobutylaniline | " |
| N-methyl-N-ethylaniline | " |
| N-methyl-N-propylaniline | " |
| N-ethyl-N-propylaniline | " |
| N-propyl-N-isopropylaniline | " |
| 2-methyl-N-methylaniline | yellowish red |
| 2-methyl-N-ethylaniline | " |
| 2-methyl-N-β-cyanoethylaniline | " |
| N-isobutylaniline | " |
| N-β-cyanoethylaniline | " |
| 2-hydroxy-N-β-cyanoethylaniline | bluish red |
| N-benzylaniline | yellowish red |

| Dyestuff from 4,4'-dimethoxy-2-methylbenzophenone and | Shade on polyacrylonitrile |
|---|---|
| 2-methyl-N-benzylaniline | red |
| 2-ethyl-N-β-cyanoethylaniline | " |
| 2,3-dimethyl-N-β-cyanoethylaniline | Bordeaux |
| 2,5-dimethyl-N-β-cyanoethylaniline | " |
| 1-phenyl-3-methylpyrazoline | strongly bluish Bordeaux |
| 1,2,3,3-tetramethylindoline | red |
| 3-methyl-N-ethyl-N-β-chloroethyl-aniline | Bordeaux |

| Dyestuff from 2-methyl-4-methoxy-4'-propoxybenzophenone and | Shade on polyacrylonitrile |
|---|---|
| dimethylaniline | bluish red |
| diethylaniline | " |
| di-n-propylaniline | " |
| di-n-butylaniline | " |
| N-methyl-N-β-hydroxyethylaniline | " |
| N-methyl-N-isopropylaniline | red |
| N-methyl-N-isobutylaniline | bluish red |
| N-ethyl-N-isopropylaniline | " |
| N-isopropyl-N-isobutylaniline | " |
| N-methyl-N-ethylaniline | " |
| N-methyl-N-propylaniline | " |
| N-ethyl-N-propylaniline | " |
| N-propyl-N-isopropylaniline | " |
| β-anilino-isobutyric acid-methylester | clear red |
| N-ethyl-o-anisidine | strongly bluish red |

| Dyestuff from 4,4'-dimethoxy-3-methylbenzophenone and | Shade on polyacrylonitrile |
|---|---|
| dimethylaniline | red-Bordeaux |
| diethylaniline | " |
| di-n-propylaniline | reddish Bordeaux |
| di-n-butylaniline | " |
| N-methyl-N-β-hydroxyethylaniline | red-Bordeaux |
| N,N-di-β-hydroxyethylaniline | strongly bluish red |
| N-methyl-N-β-cyanoethylaniline | bluish red |
| N-butyl-N-β-chloroethylaniline | reddish Bordeaux |
| N-ethyl-n-benzylaniline | " |
| N,N-dibenzylaniline | strongly bluish red |
| N-phenylmorpholine | reddish Bordeaux |
| N,N-diisopropylaniline | red-Bordeaux |
| N-methyl-N-isopropylaniline | bluish red |
| N-methyl-N-isobutylaniline | red-Bordeaux |
| N-ethyl-N-isopropylaniline | strongly bluish red |
| N-isopropyl-N-isobutylaniline | Bordeaux |
| N-methyl-N-ethylaniline | red-Bordeaux |
| N-methyl-N-propylaniline | reddish Bordeaux |
| N-ethyl-N-propylaniline | " |
| N-propyl-N-isopropylaniline | red-Bordeaux |
| n-butylaniline | red |
| isobutylaniline | bluish red |
| β-anilino-isobutyric acid-methylester | red |
| N-methyl-o-toluidine | bluish red |
| N-ethyl-o-toluidine | somewhat bluish red |
| N-cyanoethyl-o-toluidine | red |
| N-cyanoethyl-2-ethylaniline | somewhat bluish red |
| 1,2,3,3-tetramethylindoline | Bordeaux |
| 1,3-diphenylpyrazoline | blue-green |

| Dyestuff from 4,4'-dimethoxy-2-methyl-5-chlorobenzophenone and | Shade on polyacrylonitrile |
|---|---|
| dimethylaniline | bluish red |
| diethylaniline | bluish red |
| di-n-propylaniline | bluish red |
| di-n-butylaniline | bluish red |
| N-methyl-N-β-hydroxyethylaniline | bluish red |
| N-butyl-N-β-hydroxyethylaniline | bluish red |
| N,N-di-β-hydroxyethylaniline | strongly bluish red |
| N-methyl-N-β-cyanoethylaniline | bluish red |
| N-butyl-N-β-chloroethylaniline | bluish red |
| N-methyl-N-benzylaniline | red-Bordeaux |
| N-ethyl-N-benzylaniline | bluish red |
| N-methyldiphenylamine | bluish Bordeaux |
| N-methyl-N-4-ethoxyphenylaniline | strongly bluish Bordeaux |
| N-phenylmorpholine | strongly bluish red |
| 3-ethoxy-N,N-diethylaniline | yellowish red |
| N,N-diisopropylaniline | yellowish red |
| N-methyl-N-β-methoxyethylaniline | strongly bluish red |
| N,N-di-β-methoxyethylaniline | bluish red |

| Dyestuff from 4,4'-dimethoxy-2-methyl-5-chlorobenzophenone and | Shade on polyacrylonitrile |
|---|---|
| N-methyl-N-isopropylaniline | bluish red |
| N-methyl-N-isobutylaniline | bluish red |
| N-ethyl-N-isopropylaniline | bluish red |
| N-isopropyl-N-isobutylaniline | strongly bluish red |
| N-methyl-N-ethylaniline | bluish red |
| N-methyl-N-propylaniline | bluish red |
| N-ethyl-N-propylaniline | bluish red |
| N-propyl-N-isopropylaniline | bluish red |

| Dyestuff from 4,4'-dimethoxy-2-chloro-3-methylbenzophenone and | Shade on polyacrylonitrile |
|---|---|
| dimethylaniline | red |
| diethylaniline | red |
| di-n-propylaniline | red-Bordeaux |
| di-n-butylaniline | bluish red |
| N-methyl-N-β-hydroxyethylaniline | red-Bordeaux |
| N,N-di-β-hydroxyethylaniline | bluish red |
| N-methyl-N-β-cyanoethylaniline | red-Bordeaux |
| N-butyl-N-β-chloroethylaniline | bluish red |
| N-methyl-N-benzylaniline | bluish red |
| 3-ethoxy-N,N-diethylaniline | yellowish red |
| N,N-diisopropylaniline | red |
| N-methyl-N-β-methoxyethylaniline | bluish red |
| N-methyl-N-isopropylaniline | red |
| N-methyl-N-isobutylaniline | red |
| N-ethyl-N-isopropylaniline | bluish red |
| N-isopropyl-N-isobutylaniline | bluish red |
| N-methyl-N-ethylaniline | red |
| N-methyl-N-propylaniline | bluish red |
| N-ethyl-N-propylaniline | bluish red |
| N-propyl-N-isopropylaniline | red-Bordeaux |

| Dyestuff from 4,4'-dimethoxy-2-chloro-5-methylbenzophenone and | Shade on polyacrylonitrile |
|---|---|
| dimethylaniline | red |
| diethylaniline | red |
| di-n-propylaniline | bluish red |
| di-n-butylaniline | bluish red |
| N-methyl-N-β-hydroxyethylaniline | bluish red |
| N,N-di-β-hydroxyethylaniline | strongly bluish red |
| N-methyl-N-β-cyanoethylaniline | bluish red |
| N-butyl-N-β-chloroethylaniline | strongly bluish red |
| N-methyl-N-benzylaniline | strongly bluish red |
| N-methyldiphenylamine | bluish Bordeaux |
| 3-methyl-N,N-dimethylaniline | bluish Bordeaux |
| 3-chloro-N,N-dimethylaniline | currant-blue |
| 3-methyl-N-ethyl-N-β-hydroxyethyl-aniline | strongly bluish Bordeaux |
| 3-ethoxy-N,N-diethylaniline | yellowish red |
| N,N-diisopropylaniline | yellowish red |
| 2-methyl-5-methoxy-N,N-dimethyl-aniline | granate |
| N-methyl-N-β-methoxyethylaniline | red-Bordeaux |
| N,N-di-β-methoxyethylaniline | strongly bluish red |
| N-methyl-N-isopropylaniline | bluish red |
| N-methyl-N-isobutylaniline | red-Bordeaux |
| N-ethyl-N-isopropylaniline | bluish red |
| N-isopropyl-N-isobutylaniline | Bordeaux |
| N-methyl-N-ethylaniline | red |
| N-methyl-N-propylaniline | red |
| N-ethyl-N-propylaniline | bluish red |
| N-propyl-N-isopropylaniline | strongly bluish red |
| N-ethyl-2-methylaniline | yellowish red |
| 2-methyl-N-β-cyanoethylaniline | red |

| Dyestuff from 4,4'-dimethoxy-3-chloro-5-methylbenzophenone and | Shade on polyacrylonitrile |
|---|---|
| dimethylaniline | red-Bordeaux |
| diethylaniline | red Bordeaux |

| Dyestuff from 4,4'-dimethoxy-2,3-dimethylbenzophenone and | Shade on polyacrylonitrile |
|---|---|
| dimethylaniline | bluish red |
| diethylaniline | " |
| di-n-propylaniline | " |

-continued

| Dyestuff from 4,4'-dimethoxy-2,3-dimethylbenzophenone and | Shade on polyacrylonitrile |
|---|---|
| di-n-butylaniline | " |
| N-methyl-N-β-hydroxyethylaniline | " |
| N,N-diisopropylaniline | red |
| N-methyl-N-isopropylaniline | bluish red |
| N-methyl-N-isobutylaniline | " |
| N-ethyl-N-isopropylaniline | " |
| N-isopropyl-N-isobutylaniline | strongly bluish red |
| N-methyl-N-ethylaniline | bluish red |
| N-methyl-N-propylaniline | " |
| N-ethyl-N-propylaniline | " |
| N-propyl-N-isopropylaniline | strongly bluish red |
| isobutylaniline | red |
| α-anilino-isobutyric acid-methylester | clear yellowish red |
| N-methyl-o-toluidine | red |
| N-ethyl-o-toluidine | somewhat yellowish red |
| N-cyanoethyl-o-toluidine | red |
| N-cyanoethyl-2-ethylaniline | somewhat bluish red |

| Dyestuff from 4,4'-dimethoxy-2,5-dimethylbenzophenone and | Shade on polyacrylonitrile |
|---|---|
| dimethylaniline | bluish red |
| diethylaniline | " |
| di-n-propylaniline | red-Bordeaux |
| di-n-butylaniline | bluish red |
| N-methyl-N-β-hydroxyethylaniline | red-Bordeaux |
| N,N-di-β-hydroxyethylaniline | bluish red |
| N-methyl-N-β-cyanoethylaniline | red-Bordeaux |
| N-butyl-N-β-chloroethylaniline | bluish red |
| N-methyl-N-benzylaniline | bluish red |
| N-ethyl-N-benzylaniline | strongly bluish red |
| 3-ethoxy-N,N-diethylaniline | red-Bordeaux |
| N-methyl-N-β-methoxyethylaniline | bluish red |
| N-methyl-N-isopropylaniline | " |
| N-methyl-N-isobutylaniline | red-Bordeaux |
| N-ethyl-N-isopropylaniline | bluish red |
| N-isopropyl-N-isobutylaniline | red-Bordeaux |
| N-methyl-N-ethylaniline | bluish red |
| N-methyl-N-propylaniline | strongly bluish red |
| N-ethyl-N-propylaniline | red-Bordeaux |
| N-propyl-N-isopropylaniline | " |
| N-n-butylaniline | somewhat yellowish red |
| isobutylaniline | red |
| α-anilino-isobutyric acid-methylester | " |
| N-methyl-o-toluidine | " |
| N-ethyl-o-toluidine | " |
| N-cyanoethyl-o-toluidine | " |
| N-cyanoethyl-2-ethylaniline | " |

| Dyestuff from 4,4'-dimethoxy-3,3'-dimethylbenzophenone and | Shade on polyacrylonitrile |
|---|---|
| dimethylaniline | red-Bordeaux |
| diethylaniline | " |
| di-n-propylaniline | Bordeaux |
| N-methyl-N-β-cyanoethylaniline | bluish red |
| N-methyl-N-β-hydroxyethylaniline | Bordeaux |
| N-methyl-N-benzylaniline | red-Bordeaux |
| 3-ethoxy-N,N-diethylaniline | bluish red |
| N,N-diisopropylaniline | strongly bluish red |
| N,N-di-β-methoxyethylaniline | red-Bordeaux |
| N-methyl-N-isopropylaniline | reddish Bordeaux |
| N-methyl-N-isobutylaniline | " |
| N-ethyl-N-isopropylaniline | " |
| N-isopropyl-N-isobutylaniline | Bordeaux |
| N-methyl-N-ethylaniline | strongly bluish red |
| N-methyl-N-propylaniline | reddish Bordeaux |
| N-ethyl-N-propylaniline | reddish Bordeaux |
| N-propyl-N-isopropylaniline | Bordeaux |
| 2-methyl-N-β-cyanoethylaniline | bluish red |

| Dyestuff from 4,4'-dimethoxy-3,5-dimethylbenzophenone and | Shade on polyacrylonitrile |
|---|---|
| dimethylaniline | bluish red |
| diethylaniline | strongly bluish red |
| di-n-propylaniline | " |
| di-n-butylaniline | " |
| N-methyl-N-β-hydroxyethylaniline | " |
| N-butyl-N-β-hydroxyethylaniline | " |
| N,N-di-β-hydroxyethylaniline | " |
| N-methyl-N-β-cyanoethylaniline | bluish red |

| Dyestuff from 4,4'-dimethoxy-3,5-dimethylbenzophenone and | Shade on polyacrylonitrile |
|---|---|
| N-butyl-N-β-chloroethylaniline | strongly bluish red |
| N-methyl-N-benzylaniline | " |
| N-ethyl-N-benzylaniline | " |
| N-phenylmorpholine | " |
| 3-methyl-N,N-dimethylaniline | strongly bluish Bordeaux |
| 3-methyl-N-ethyl-N-β-hydroxyethylaniline | " |
| 3-ethoxy-N,N-diethylaniline | Bordeaux |
| 3-methoxy-N,N-dimethylaniline | red-Bordeaux |
| N,N-diisopropylaniline | red |
| N-methyl-N-isopropylaniline | bluish red |
| N-methyl-N-isobutylaniline | strongly bluish red |
| N-ethyl-N-isopropylaniline | " |
| N-isopropyl-N-isobutylaniline | " |
| N-methyl-N-ethylaniline | bluish red |
| N-methyl-N-propylaniline | strongly bluish red |
| N-ethyl-N-propylaniline | strongly bluish red |
| N-propyl-N-isopropylaniline | red-Bordeaux |

| Dyestuff from 4,4'-dimethoxy-2-methyl-6-ethylbenzophenone and | Shade on polyacrylonitrile |
|---|---|
| 2-methyl-N-methylaniline | strongly yellowish red |
| 2-methyl-N-ethylaniline | " |
| 1,2,3,3-tetramethylindoline | " |
| 1,3-diphenylpyrazoline | reddish blue |
| dimethylaniline | red |
| diethylaniline | " |
| di-n-propylaniline | bluish red |
| N-methyl-N-β-cyanoethylaniline | strongly bluish red |
| N-methyl-N-β-hydroxyethylaniline | bluish red |

| Dyestuff from 4,4'-dimethoxy-3,3'-diethylbenzophenone and | Shade on polyacrylonitrile |
|---|---|
| dimethylaniline | strongly bluish red |
| diethylaniline | ruby |

| Dyestuff from 4,4'-dimethoxy-3-isopropylbenzophenone and | Shade on polyacrylonitrile |
|---|---|
| dimethylaniline | red-Bordeaux |
| diethylaniline | " |
| di-n-propylaniline | reddish Bordeaux |
| di-n-butylaniline | Bordeaux |
| N-methyl-N-β-hydroxyethylaniline | red-Bordeaux |
| N,N-di-β-hydroxyethylaniline | " |
| N-methyl-N-β-cyanoethylaniline | red-Bordeaux |
| N-butyl-N-β-chloroethylaniline | " |
| N-methyl-N-benzylaniline | " |
| N-ethyl-N-benzylaniline | reddish Bordeaux |
| N-methyldiphenylamine | strongly bluish Bordeaux |
| N-methyl-N-4-ethoxyphenylaniline | currant-grey |
| N-phenylmorpholine | reddish Bordeaux |
| 3-methyl-N,N-dimethylaniline | currant |
| 3-ethoxy-N,N-diethylaniline | reddish Bordeaux |
| N,N-diisopropylaniline | red-Bordeaux |
| N-methyl-N-β-methoxyethylaniline | " |
| N-methyl-N-isopropylaniline | strongly bluish red |
| N-methyl-N-isobutylaniline | red-Bordeaux |
| N-ethyl-N-isopropylaniline | strongly bluish red |
| N-isopropyl-N-isobutylaniline | Bordeaux |
| N-methyl-N-ethylaniline | red-Bordeaux |
| N-methyl-N-propylaniline | red-Bordeaux |
| N-ethyl-N-propylaniline | reddish Bordeaux |
| N-propyl-N-isopropylaniline | " |

| Dyestuff from 4,4'-dimethoxy-3,5-diisopropylbenzophenone and | Shade on polyacrylonitrile |
|---|---|
| dimethylaniline | bluish red |
| diethylanilie | " |
| N-methyl-N-β-hydroxyethylaniline | strongly bluish red |
| N-methyl-N-isobutylaniline | " |

| Dyestuff from 2,4,4'-trimethoxy-benzophenone and | Shade on polyacrylonitrile |
|---|---|
| dimethylaniline | reddish Bordeaux |
| diethylaniline | " |
| di-n-propylaniline | Bordeaux |
| di-n-butylaniline | " |
| N-butyl-N-β-chloroethylaniline | Bordeaux |
| N-ethyl-N-β-dimethylaminoethyl-aniline | " |
| N-methyl-N-isopropylaniline | " |
| N-ethyl-N-isopropylaniline | " |
| N-propyl-N-isopropylaniline | " |
| N-methyl-N-ethylaniline | reddish Bordeaux |
| N-methyl-N-propylaniline | " |
| N-ethyl-N-propylaniline | Bordeaux |
| N-methyl-N-isobutylaniline | " |

| Dyestuff from 3,4,4'-trimethoxy-benzophenone and | Shade on polyacrylonitrile |
|---|---|
| dimethylaniline | reddish Bordeaux |
| diethylaniline | Bordeaux |
| di-n-propylaniline | " |
| di-n-butylaniline | " |
| N-methyl-N-β-hydroxyethylaniline | " |
| N,N-di-β-hydroxyethylaniline | " |
| N-methyl-N-β-cyanoethylaniline | reddish Bordeaux |
| N-butyl-N-β-chloroethylaniline | Bordeaux |
| N-methyl-N-benzylaniline | " |
| N-ethyl-N-benzylaniline | " |
| N,N-dibenzylaniline | bluish Bordeaux |
| N-methyldiphenylamine | strongly bluish Bordeaux |
| N-methyl-N-4-ethoxyphenylaniline | currant-grey |
| N-phenylmorpholine | Bordeaux |
| 3-ethoxy-N,N-diethylaniline | " |
| N,N-diisopropylaniline | bluish red |
| N,N-di-β-methoxyethylaniline | Bordeaux |
| N-methyl-N-isopropylaniline | strongly bluish red |
| N-methyl-N-isobutylaniline | Bordeaux |
| N-ethyl-N-isopropylaniline | strongly bluish red |
| N-isopropyl-N-isobutylaniline | bluish Bordeaux |
| N-methyl-N-ethylaniline | reddish Bordeaux |
| N-methyl-N-propylaniline | Bordeaux |
| N-ethyl-N-propylaniline | " |
| N-propyl-N-isopropylaniline | " |
| n-butylaniline | red |
| isobutylaniline | " |
| N-cyanoethylaniline | somewhat bluish red |
| α-anilino-isobutyric acid-methylester | bluish red |
| N-methyl-o-toluidine | " |
| N-ethyl-o-toluidine | somewhat bluish red |
| N-cyanoethyl-o-toluidine | " |
| 1,3-diphenylpyrazoline | greenish dark-blue |
| N-phenylmorpholine | Bordeaux |
| 1,2,3,3-tetramethylindoline | " |

| Dyestuff from dimethylaniline and | Shade on polyacrylonitrile |
|---|---|
| 4-methoxy-4'-ethoxy-2,5-dimethylbenzophenone | bluish red |
| 4-methoxy-4'-ethoxy-2-methylbenzophenone | red |
| 4-methoxy-4'-ethoxy-2-chlorobenzophenone | " |
| 4-methoxy-4'-ethoxy-2'-methylbenzophenone | red |
| 4-methoxy-4'-ethoxy-2'-methyl-5'-chlorobenzophenone | bluish red |
| 4-methoxy-4'-ethoxy-2'-chloro-5'-methylbenzophenone | red |
| 4-methoxy-5'-ethoxy-2'-chloro-benzophenone | " |
| 4-methoxy-4'-propoxy-2'-methyl-benzophenone | bluish red |
| 4-methoxy-4'-ethoxy-2-chloro-5-methylbenzophenone | red |
| 3,4,5,4'-tetramethoxybenzophenone | red-Bordeaux |
| 2,4,6,4'-tetramethoxybenzophenone | strongly bluish red |
| 2,3,4,4'-tetramethoxybenzophenone | bluish red |
| 4-methoxy-4'-isobutoxybenzophenone | " |
| 4-ethoxy-4'-n-propoxybenzophenone | " |
| 4-methoxy-4'-ethoxybenzophenone | red-Bordeaux |
| 4-methoxy-4'-n-propoxybenzophenone | bluish red |
| 4-methoxy-4'-isopropoxybenzophenone | " |
| 4-methoxy-4'-n-butoxybenzophenone | " |
| 4,4'-di-n-propoxybenzophenone | " |
| 4,4'-di-n-butoxybenzophenone | " |
| 2-methyl-4-methoxy-4'-propoxy-benzophenone | " |
| 4,4'-dimethoxy-2-chlorobenzophenone | red |
| 4,4'-dimethoxy-3-chlorobenzophenone | bluish red |
| 4,4'-dimethoxy-3,3'-dichlorobenzophenone | " |
| 4,4'-dimethoxy-2-methylbenzophenone | red |
| 4,4'-dimethoxy-3-methylbenzophenone | red-Bordeaux |
| 4,4'-dimethoxy-2-methyl-5-chloro-benzophenone | bluish red |
| 4,4'-dimethoxy-2-chloro-3-methyl-benzophenone | red |
| 4,4'-dimethoxy-2-chloro-5-methyl-benzophenone | red |
| 4,4'-dimethoxy-3-chloro-5-methyl-benzophenone | red-Bordeaux |
| 4,4'-dimethoxy-2,3-dimethylbenzophenone | bluish red |
| 4,4'-dimethoxy-2,5-dimethylbenzophenone | bluish red |
| 4,4'-dimethoxy-3,3'-dimethylbenzophenone | red-Bordeaux |
| 4,4'-dimethoxy-3,5-dimethylbenzophenone | bluish red |
| 4,4'-dimethoxy-2-bromobenzophenone | red |
| 4,4'-dimethoxy-3-bromobenzophenone | bluish red |
| 4,4'-dimethoxy-2-methyl-6-ethylbenzophenone | red |
| 4,4'-dimethoxy-3,3'-diethylbenzophenone | strongly bluish red |
| 4,4'-dimethoxy-3-isopropylbenzophenone | red-Bordeaux |
| 4,4'-dimethoxy-3,5-diisopropylbenzophenone | bluish red |
| 3,4,4'-trimethoxybenzophenone | reddish Bordeaux |

| Dyestuff from 2-methyl-N-methylaniline and | Shade on polyacrylonitrile |
|---|---|
| 4-methoxy-4'-ethoxybenzophenone | bluish red |
| 4,4'-diethoxybenzophenone | bluish red |
| 4-ethoxy-4'-propoxybenzophenone | red |
| 4,4'-di-n-propoxybenzophenone | red |

| Dyestuff from dimethylaniline and | Shade on polyacrylonitrile |
|---|---|
| 4-methoxy-4,'-ethoxy-2,5-dimethylbenzophenone | bluish red |
| 4-methoxy-4'-ethoxy-2-methylbenzophenone | red |
| 4-methoxy-4'-ethoxy-2-chlorobenzophenone | " |
| 4-methoxy-4'-ethoxy-2'-methylbenzophenone | " |
| 4-methoxy-4'-ethoxy-2'-methyl-5'-chlorobenzophenone | bluish red |
| 4-methoxy-4'-ethoxy-2'-chloro-5'methylbenzophenone | red |
| 4-methoxy-4'-ethoxy-2'-chlorobenzophenone | " |
| 4-methoxy-'propoxy-2'-methylbenzophenone | bluish red |
| 4-methoxy-4'-ethoxy-4-chloro-5-methylbenzophenone | red |
| 3,4,5,4'-tetramethoxybenzophenone | red-Bordeaux |
| 2,4,6,4'-tetramethoxybenzophenone | strongly bluish red |
| 2,3,4,4'-tetramethoxybenzophenone | bluish red |
| 4-methoxy-4'-isobutoxybenzophenone | bluish red |
| 4-ethoxy-4'-n-propoxybenzophenone | " |

| Dyestuff from N-methyldiphenylamine and | Shade on polyacrylonitrile |
|---|---|
| 4-methoxy-4'-ethoxybenzophenone | bluish Bordeaux |
| 4,4'-diethoxybenzophenone | strongly bluish Bordeaux |
| 4,4'-di-n-propoxybenzophenone | strongly bluish Bordeaux |
| 4,4'-di-n-butoxybenzophenone | " |

| Dyestuff from N-methyl-N-4-ethoxy-phenylaniline and | Shade on polyacrylonitrile |
|---|---|
| 4-methoxy-4'-ethoxybenzophenone | currant |
| 4,4'-diethoxybenzophenone | currant-grey |
| 4,4'-di-n-propoxybenzophenone | bluish currant |

| Dyestuff from 3-methyl-N,N-dimethyl-aniline and | Shade on polyacrylonitrile |
|---|---|
| 4,4'-dimethoxybenzophenone | currant |
| 4,4'-dimethoxy-2-chloro-5-methyl-benzophenone | bluish Bordeaux |
| 4,4'-dimethoxy-3,5-dimethylbenzophenone | bluish Bordeaux |
| 4,4'-dimethoxy-3-isopropylbenzophenone | currant |

| Dyestuff from 3-chloro-N,N-dimethyl-aniline and | Shade on polyacrylonitrile |
|---|---|
| 4,4'-dimethoxybenzophenone | currant-blue |
| 4,4'-dimethoxy-2-chloro-5-methyl-benzophenone | currant-blue |
| 4,4'-dimethoxy-3,5-dimethylbenzophenone | strongly bluish Bordeaux |

| Dyestuff from N-methyldiphenyl-amine and | Shade on polyacrylonitrile |
|---|---|
| 4,4'-dimethoxy-2-chlorobenzophenone | bluish Bordeaux |
| 4,4'-dimethoxy-2-methyl-5-chloro-benzophenone | bluish Bordeaux |
| 4,4'-dimethoxy-2-chloro-5-methyl-benzophenone | bluish Bordeaux |
| 4,4'-dimethoxy-3-isopropylbenzophenone | strongly bluish Bordeaux |
| 3,4,4'-trimethoxybenzophenone | strongly bluish Bordeaux |

| Dyestuff from N-methyl-N-(4-ethoxy-phenyl)-aniline and | Shade on polyacrylonitrile |
|---|---|
| 4,4'-dimethoxy-2-chlorobenzophenone | strongly bluish Bordeaux |
| 4,4'-dimethoxy-2-methyl-5-chloro-benzophenone | strongly bluish Bordeaux |
| 4,4'-dimethoxy-3-isopropylbenzophenone | currant-grey |
| 3,4,4'-trimethoxybenzophenone | currant-grey |

| Dyestuff from 2-methyl-N-methyl-aniline and | Shade on polyacrylonitrile |
|---|---|
| 4,4'-dimethoxybenzophenone | bluish red |
| 4,4'-dimethoxy-2-methyl-6-ethyl-benzophenone | strongly yellowish red |

| Dyestuff from 3-methoxy-N,N-dimethyl-aniline and | Shade on polyacrylonitrile |
|---|---|
| 4,4'-dimethoxy-2-chlorobenzophenone | yellowish red |
| 4,4'-dimethoxy-3,5-dimethylbenzophenone | red-Bordeaux |
| 4,4'-dimethoxy-3,3'-dimethylbenzophenone | bluish red |

| Dyestuff from 2-methyl-5-methoxy-N,N-dimethylaniline and | Shade on polyacrylonitrile |
|---|---|
| 4,4'-dimethoxy-2-chloro-5-methylbenzophenone | granate |

| Dyestuff from 4,4'-dimethoxy-2-bromobenzophenone and | Shade on polyacrylonitrile |
|---|---|
| diethylaniline | red |
| di-n-propylaniline | bluish red |
| diisopropylaniline | yellowish red |
| di-n-butylaniline | bluish red |
| N-methyl-N-ethylaniline | red |
| N-methyl-N-propylaniline | bluish red |
| N-ethyl-N-propylaniline | " |
| isobutylaniline | somewhat yellowish red |
| N-methyl-o-toluidine | yellowish red |
| N-ethyl-o-toluidine | somewhat yellowish red |
| N-cyanoethyl-o-toluidine | somewhat bluish red |
| 1,2,3,3-tetramethylindoline | " |

| Dyestuff from 4,4'-dimethoxy-3-bromobenzophenone and | Shade on polyacrylonitrile |
|---|---|
| diethylaniline | bluish red |
| di-n-propylaniline | " |
| N,N-diisopropylaniline | red |
| di-n-butylaniline | strongly bluish red |
| N-methyl-N-ethylaniline | bluish red |
| N-methyl-N-propylaniline | " |
| N-ethyl-N-propylaniline | " |

| Dyestuff from 4-methoxy-4'-ethoxy-2-methylbenzophenone and | Shade on polyacrylonitrile |
|---|---|
| diethylaniline | bluish red |
| di-n-propylaniline | " |
| diisopropylaniline | yellowish red |
| di-n-butylaniline | bluish red |
| N-methyl-N-ethylaniline | " |
| N-methyl-N-propylaniline | " |
| N-ethyl-N-propylaniline | " |

| Dyestuff from 4-methoxy-4'-ethoxy-2,5-dimethylbenzophenone and | Shade on polyacrylonitrile |
|---|---|
| diethylaniline | bluish red |
| di-n-propylaniline | red-Bordeaux |
| di-n-butylaniline | " |
| N-methyl-N-ethylaniline | bluish red |

| Dyestuff from 4-methoxy-4'-ethoxy-2-chlorobenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | " |
| N-ethyl-N-propylaniline | bluish red |
| α-anilino-isobutyric acid-methylester | somewhat bluish red |
| isobutylaniline | red |
| N-methyl-o-toluidine | " |
| N-ethyl-o-toluidine | " |
| N-cyanoethyl-o-toluidine | somewhat bluish red |
| N-cyanoethyl-2-ethylaniline | " |

| Dyestuff from 4-methoxy-4'-ethoxy-2'-methylbenzophenone and | Shade on polyacrylonitrile |
|---|---|
| diethylaniline | bluish red |
| di-n-propylaniline | " |
| di-n-butylaniline | " |
| N-methyl-N-ethylaniline | red |
| N-methyl-N-propylaniline | bluish red |
| N-ethyl-N-propylaniline | " |
| isobutylaniline | red |
| N-methyl-o-toluidine | " |
| N-ethyl-o-toluidine | " |
| N-cyanoethyl-o-toluidine | " |
| N-n-propyl-o-toluidine | " |
| N-i-propyl-o-toluidine | " |
| N-n-butyl-o-toluidine | " |
| α-anilino-isobutyric acid-methylester | strongly bluish scarlet |

| Dyestuff from 4-methoxy-4'-ethoxy-2'-methylbenzophenone and | Shade on polyacrylonitrile |
|---|---|
| 1,2,3,3-tetramethylindoline | bluish red |

| Dyestuff from 4-methoxy-4'-ethoxy-2'-methyl-5'-chlorobenzophenone and | Shade on polyacrylonitrile |
|---|---|
| diethylaniline | bluish red |
| di-n-propylaniline | " |
| N-methyl-N-ethylaniline | " |
| N-methyl-N-propylaniline | " |
| N-ethyl-N-propylaniline | " |

| Dyestuff from 4-methoxy-4'-ethoxy-2'-chlorobenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | " |
| N-ethyl-N-propylaniline | bluish red |

| Dyestuff from 4-methoxy-4'-ethoxy-2'-chloro-5'-methylbenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | bluish red |
| N-ethyl-N-propylaniline | " |

| Dyestuff from 4-methoxy-4'-n-propoxy-2'-methylbenzophenone and | Shade on polyacrylonitrile |
|---|---|
| diethylaniline | bluish red |
| di-n-propylaniline | " |
| N-methyl-N-ethylaniline | red |
| N-methyl-N-propylaniline | " |
| N-ethyl-N-propylaniline | bluish red |

| Dyestuff from 4-methoxy-4'-ethoxy-2-chloro-5-methylbenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | " |
| N-ethyl-N-propylaniline | bluish red |

| Dyestuff from 3,4,5,4'-tetramethoxybenzophenone and | Shade on polyacrylonitrile |
|---|---|
| diethylaniline | red-Bordeaux |

| Dyestuff from 2,4,6,4'-tetramethoxybenzophenone and | Shade on polyacrylonitrile |
|---|---|
| diethylaniline | strongly bluish red |

| Dyestuff from 2,3,4,4'-tetramethoxybenzophenone and | Shade on polyacrylonitrile |
|---|---|
| diethylaniline | bluish red |
| di-n-propylaniline | strongly bluish red |

| Dyestuff from 4-methoxy-4'-isobutoxybenzophenone and | Shade on polyacrylonitrile |
|---|---|
| diethylaniline | strongly bluish red |
| α-anilino-isobutyric acid-methylester | clear red |
| N-ethyl-o-anisidine | Bordeaux |

| Dyestuff from 4-ethoxy-4'-n-propoxybenzophenone and | Shade on polyacrylonitrile |
|---|---|
| diethylaniline | bluish red |
| di-n-propylaniline | strongly bluish red |
| diisopropylaniline | bluish red |
| di-n-butylaniline | strongly bluish red |
| N-methyl-N-ethylaniline | bluish red |
| N-methyl-N-propylaniline | bluish red |
| N-ethyl-N-propylaniline | strongly bluish red |

| Dyestuff from 4-n-propoxy-2'-chlorobenzophenone and | Shade on polyacrylonitrile |
|---|---|
| dimethylaniline | bluish red |
| diethylaniline | somewhat bluish red |
| di-n-propylaniline | bluish red |
| N-methyl-N-β-cyanoethylaniline | clear ruby |
| n-butylaniline | yellowish red |
| isobutylaniline | " |
| N-methyl-o-toluidine | " |
| N-ethyl-o-toluidine | " |
| N-cyanoethyl-o-toluidine | bluish red |
| 1,2,3,3-tetramethylindoline | yellowish red |
| N-phenylmorpholine | strongly bluish red |

| Dyestuff from 4-n-butoxy-2'-chlorobenzophenone and | Shade on polyacrylonitrile |
|---|---|
| dimethylaniline | somewhat bluish red |
| diethylaniline | red |
| di-n-propylaniline | somewhat bluish red |
| N-methyl-N-β-cyanoethylaniline | ruby |
| 3-diethylaminophenetole | strongly yellowish red |
| isobutylaniline | yellowish red |
| N-methyl-o-toluidine | somewhat yellowish red |
| N-ethyl-o-toluidine | red |
| N-cyanpoethyl-o-toluidine | bluish red |
| N-benzyl-o-toluidine | somewhat bluish red |
| N-phenylmorpholine | red-Bordeaux |
| 1,2,3,3-tetramethylindoline | yellowish red |
| 1,3-diphenylpyrazoline | strongly bluish violet |

| Dyestuff from 4-methoxy-4'-isobutoxybenzophenone and | Shade on polyacrylonitrile |
|---|---|
| diethylaniline | strongly bluish red |
| α-anilino-isobutyric acid-methylester | clear red |
| N-ethyl-o-anisidine | Bordeaux |

| Dyestuff from 4,4'-dimethoxy-2-methyl-5-isopropylbenzophenone and | Shade on polyacrylonitrile |
|---|---|
| isobutylaniline | red |
| α-anilino-isobutyric acid-methylester | bluish red |
| N-methyl-o-toluidine | red |
| N-ethyl-o-toluidine | " |
| N-cyanoethyl-o-toluidine | somewhat bluish red |
| N-cyanoethyl-2-ethylaniline | " |

| Dyestuff from 3,4-dimethoxy-2'-chlorobenzophenone and | Shade on polyacrylonitrile |
|---|---|
| dimethylaniline | strongly bluish red |
| diethylaniline | strongly bluish red |
| di-n-propylaniline | reddish Bordeaux |

| Dyestuff from 3,4-dimethoxy-2'-chlorobenzophenone and | Shade on polyacrylonitrile |
|---|---|
| 3-diethylaminophenetole | yellowish brick-red |
| n-butylaniline | bluish red |
| isobutylaniline | somewhat bluish red |
| N-methyl-o-toluidine | red |
| N-cyanoethyl-o-toluidine | strongly bluish red |
| N-ethyl-o-toluidine | somewhat bluish red |
| N-cyanoethyl-2-ethylaniline | ruby |
| 1,2,3,3-tetramethylindoline | red |

| Dyestuff from 3,4-dimethoxy-2'-bromobenzophenone and | Shade on polyacrylonitrile |
|---|---|
| dimethylaniline | strongly bluish red |
| diethylaniline | strongly bluish red |
| di-n-propylaniline | Bordeaux |
| 3-diethylaminophenetole | brick-red |
| n-butylaniline | somewhat bluish red |
| isobutylaniline | somewhat bluish red |
| N-methyl-o-toluidine | yellowish red |
| N-ethyl-o-toluidine | yellowish red |
| N-cyanoethyl-o-toluidine | strongly bluish red |
| 1,1,3,3-tetramethylindoline | red |

| Dyestuff from 4-phenoxy-2'-chlorobenzophenone and | Shade on polyacrylonitrile |
|---|---|
| N-methyl-o-toluidine | orange |
| N-ethyl-o-toluidine | orange |
| dimethylaniline | strongly reddish orange |
| diethylaniline | strongly yellowish red |
| di-n-propylaniline | strongly yellowish red |

| Dyestuff from 4-phenoxy-2'-methylbenzophenone and | Shade on polyacrylonitrile |
|---|---|
| dimethylaniline | yellowish scarlet |
| diethylaniline | yellowish scarlet |
| di-n-propylaniline | strongly yellowish red |
| methyl-cyanoethylaniline | somewhat yellowish red |
| methyl-hydroxyethylaniline | somewhat yellowish red |
| N-butyl-β-chloroethylaniline | somewhat yellowish red |
| N-ethyl-N-β-dimethylaminoethyl-aniline | strongly bluish red |
| N,N-dimethyl-m-toluidine | yellowish red |
| N-ethyl-N-β-dimethylaminoethyl-m-toluidine | Bordeaux |
| N-ethyl-N-benzyl-m-toluidine | strongly bluish red |
| N,N-dimethyl-m-phenetidine | orange |
| N-methyl-diphenylamine | Bordeaux |
| n-butylaniline | somewhat reddish orange |
| isobutylaniline | somewhat reddish orange |
| α-anilino-isobutyric acid-methylester | yellowish scarlet |
| N-cyanoethylaniline | yellowish scarlet |
| N-benzylaniline | yellowish scarlet |
| N-methyl-o-toluidine | somewhat reddish orange |
| N-ethyl-o-toluidine | somewhat reddish orange |
| N-isopropyl-o-toluidine | somewhat reddish orange |
| N-n-butyl-o-toluidine | somewhat reddish orange |
| N-cyanoethyl-o-toluidine | yellowish scarlet |
| N-cyanoethyl-2-ethylaniline | yellowish scarlet |
| N-benzyl-o-toluidine | scarlet |
| N-n-butyl-m-toluidine | brownish red |
| N-ethyl-2-ethylaniline | orange |
| N-ethyl-2-chloroaniline | bluish red |
| N-ethyl-o-anisidine | strongly yellowish red |
| 1,2,3,3-tetramethylindoline | somwhat reddish orange |
| N-phenylmorpholine | somewhat yellowish red |

| Dyestuff from α-anilino-isobutyric acid-methylester and | Shade on polyacrylonitrile |
|---|---|
| 2,4'-dimethoxy-benzophenone | bluish red |
| 2-methoxy-4'-ethoxy-benzophenone | bluish red |
| 2,4'-dimethoxy-3'-methyl-benzophenone | strongly bluish red |
| 2-methoxy-4'-propoxy-benzophenone | strongly bluish red |
| 2,4'-dimethoxy-2'-methyl-5'-chloro-benzophenone | clear strongly yellowish red |
| 2,4'-dimethoxy-2'-chloro-benzophenone | copper-red |
| 2,4'-dimethoxy-2'-chloro-5'-methyl-benzophenone | yellowish red |
| 2,5,4'-trimethoxy-benzophenone | strongly bluish red |
| 2,4,6,4'-tetramethoxy-benzophenone | strongly bluish red |
| 4,4'-diethoxybenzophenone | clear red |
| 4-ethoxy-4'-propoxybenzophenone | red |
| 4-methoxy-4'-isopropoxybenzophenone | clear yellowish red |
| 4,4'-dimethoxy-3,3'-dimethyl-benzophenone | clear red |
| 4,4'-dimethoxy-3,5-dimethyl-benzophenone | clear somewhat bluish red |
| 4,4'-dimethoxy-3,5-diisopropyl-benzophenone | bluish red |
| 4,4'-dimethoxy-3-chlorobenzophenone | strongly bluish red |
| 4,4'-dimethoxy-3-bromobenzophenone | somewhat bluish red |
| 4,4'-dimethoxy-2-methylbenzophenone | clear yellowish red |
| 4-methoxy-4'-propoxy-2'-methyl-benzophenone | red |
| 4,4'-dimethoxy-2-methyl-5-chloro-benzophenone | clear red |
| 4-methoxy-4'-ethoxy-2'-methyl-5'-chlorobenzophenone | clear red |
| 4-methoxy-4'-ethoxy-2'-chloro-benzophenone | bluish red |
| 4,4'-dimethoxy-2-chloro-3-methyl-benzophenone | somewhat bluish red |
| 4,4'-dimethoxy-2-chloro-5-methyl-benzophenone | red |
| 4-methoxy-4'-ethoxy-2'-chloro-5'-methylbenzophenone | bluish red |
| 4-methoxy-4'-ethoxy-2-chloro-5-methylbenzophenone | bluish red |

EXAMPLE 5

A stamp-pad ink yielding strong prints is prepared from 2 parts by weight of the triphenyl-methane dyestuff the preparation of which is described in Example 1, 60 parts by weight glycerol, 20 parts by weight of water and 20 parts by weight of spirits.

EXAMPLE 6

East Indian bastard skin which has been prepared for dyeing in the usual way is dyed in a liquor ratio of 1:10 with 1% of the dyestuff which is described in Example 1 and has previously been pasted with the same amount of 30% acetic acid, in a drum at 40° C. for 45 minutes. The leather is finished in known manner. A bluish red dyeing of good fastness properties is obtained.

EXAMPLE 7

A stamp-pad ink yielding strong prints is produced from 2 parts by weight of the triphenyl-methane dyestuff the preparation of which is described in Example 2, 60 parts by weight glycerol, 20 parts by weight of water and 20 parts by weight of spirits.

EXAMPLE 8

East Indian bastard skin which has been prepared for dyeing in the usual way is dyed in a liquor ratio of 1:10 with 1% of the dyestuff which is described in Example 2 and has previously been pasted with the same amount of 30% acetic acid, in a drum at 40° C. for 45 minutes. The leather is finished in known manner. A bluish red dyeing of good fastness properties is obtained.

EXAMPLE 9

A stamp-pad ink yielding strong prints is produced from 2 parts by weight of the triphenyl-methane dyestuff the preparation of which is described in Example 3, 60 parts by weight glycerol, 20 parts by weight of water and 20 parts by weight of spirit.

EXAMPLE 10

East Indian bastard skin which has been prepared for dyeing in the usual way is dyed in a liquor ratio of 1:10 with 1% of the dyestuff which is described in Example 3 and has previously been pasted with the same amount of 30% acetic acid, in a drum at 40° C. for 45 minutes. The leather is finished in the usual manner. A bluish red dyeing of good fastness properties is obtained.

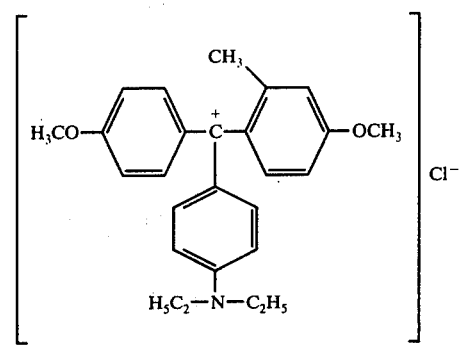
15. The dyestuff of claim 1 of the formula:
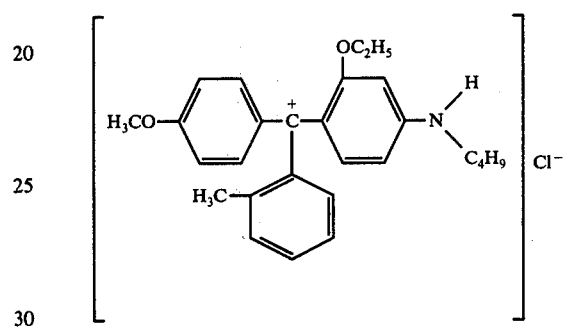
* * * * *
14. The dyestuff of claim 1 of the formula:
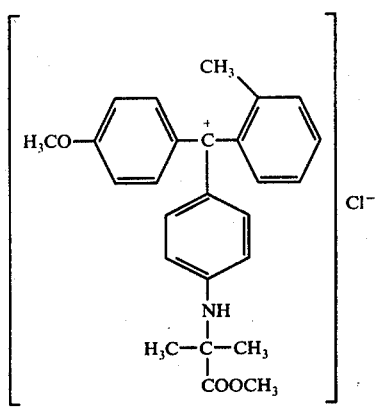

What is claimed is:

1. Triaryl methane dyestuff which is free from sulphonic acid and carboxylic acid groups and is selected from the group consisting of dyestuffs having one of the following four formulae:

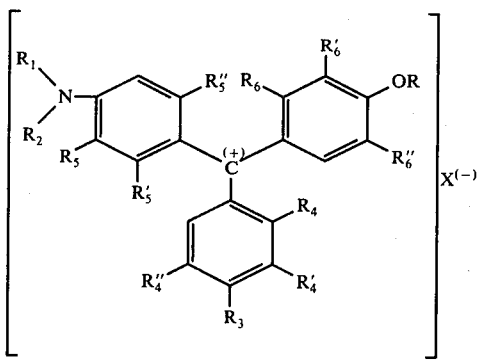

wherein
R is a lower alkyl of 1 to 4 carbon atoms, phenyl or cyclohexyl;
$R_1$ is hydrogen, a lower alkyl of 1 to 4 carbon atoms, hydroxyethyl, hydroxypropyl, methoxyethyl, chloroethyl or benzyl;
$R_2$ is a lower alkyl of 1 to 4 carbon atoms, hydroxyethyl, hydroxypropyl, methoxyethyl, chloroethyl, cyanoethyl, dimethylaminoethyl,

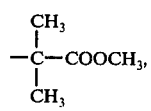

phenyl, ethoxyphenyl, benzyl, or cyclohexyl;
$R_1$ and $R_2$, additionally when joined together with the nitrogen atom are
morpholinyl,
3-methylpyrazolinyl,
3-phenylpyrazolinyl; or the radical

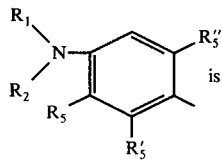

1,2,3,3-tetramethyleneindolinyl, 2-methyl-2,3-dihydroindolyl or tetrahydroquinolinyl;
$R_3$ is hydrogen, phenoxy, chlorine, lower alkyl of 1 to 4 carbon atoms, or cyclohexyl;
$R_4$ is hydrogen, methyl, ethyl, isopropyl, chlorine, bromine, or methoxy;
$R_4'$ is hydrogen, methyl, ethyl, chlorine, or methoxy;
$R_4''$ is hydrogen, methyl, isopropyl, or chlorine;
$R_5$ is hydrogen, methyl, ethyl, methoxy, ethoxy, hydroxy, or methoxycarbonyl;
$R_5'$ is hydrogen, methyl, methoxy, ethoxy, hydroxy, chlorine, or nitro;
$R_5''$ is hydrogen, methyl, methoxy, or hydroxy;
$R_6$ is hydrogen, methyl, methoxy, or chlorine;
$R_6'$ is hydrogen, methyl, ethyl, isopropyl, methoxy, chlorine, or bromine;
$R_6''$ is hydrogen, methyl, isopropyl, methoxy, or chlorine;
$R_4$ together with $R_4'$ or $R_5$ together with $R_5'$, additionally are benzene; and X is the radical of an anion;

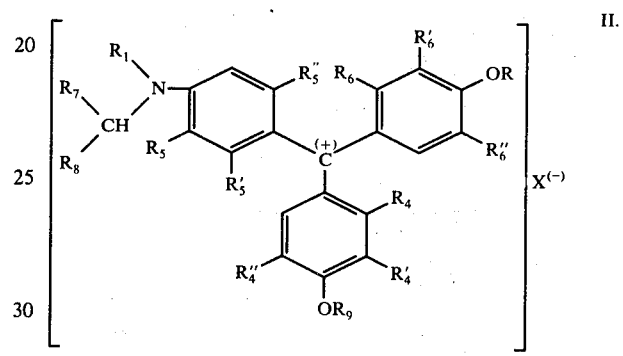

wherein
R is a lower alkyl of 1 to 4 carbon atoms or cyclohexyl;
$R_1$, $R_4$, $R_4'$, $R_4''$, $R_5$, $R_5''$, $R_6$, $R_6'$, $R_6''$, and X have the above mentioned meaning;
$R_7$ is hydrogen, methyl, or ethyl;
$R_8$ is methyl, ethyl, n-propyl, phenyl, or methyl substituted by hydroxy, methoxy, chlorine, cyano, dimethylamino; the radical

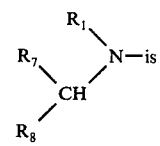

is morpholinyl, 3-methylpyrazolinyl or 3-phenylpyrazolinyl; or the radical

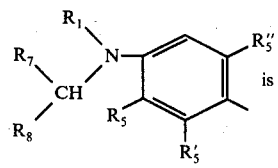

1,2,3,3-tetramethylindolinyl;
$R_9$ is a lower alkyl of 1 to 4 carbon atoms or cyclohexyl;

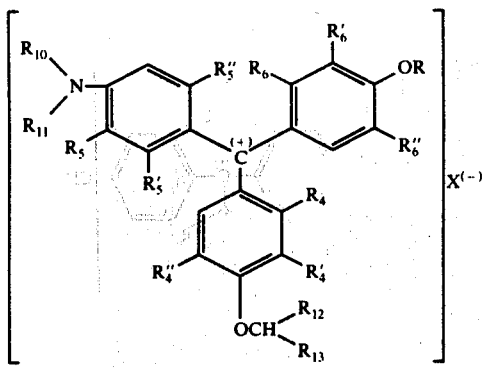

III.

wherein
R$_4$, R$_4'$, R$_4''$, R$_5$, R$_5'$, R$_5''$, R$_6$, R$_6'$, R$_6''$, and X have the above mentioned meaning;
R is a lower alkyl of 1 to 4 carbon atoms or cyclohexyl;
R$_{10}$ is hydrogen or methyl;
R$_{11}$ is methyl, phenyl, ethoxyphenyl, or cyclohexyl;
R$_{12}$ is hydrogen, lower alkyl of 1 to 4 carbon atoms or cyclohexyl;
R$_{13}$ is hydrogen or lower alkyl of 1 to 4 carbon atoms;

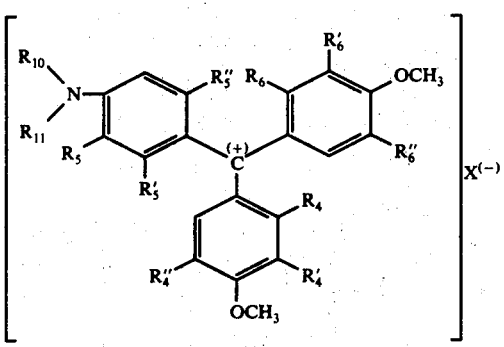

IV.

wherein
R$_{10}$, R$_{11}$, R$_4$, R$_4'$, R$_4''$, R$_5$, R$_5'$, R$_5''$, R$_6$, R$_6'$, R$_6''$ and X, have the above mentioned meaning and wherein at least one of the radicals R$_4$, R$_4'$, R$_5$, R$_5'$, R$_6$ or R$_6'$ is other than hydrogen.

2. The triaryl methane dyestuff having the formula

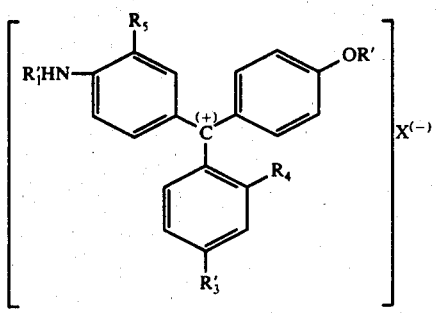

in which
R' is lower alkyl of 1 to 4 carbon atoms;
R$_1'$ is a lower alkyl of 1 to 4 carbon atoms, hydroxyethyl, hydroxypropyl, methoxyethyl or chloroethyl;
R$_3'$ is hydrogen or alkyl of 1 to 4 carbon atoms;
R$_4$ is hydrogen, alkyl of 1 to 4 carbon atoms, alkoxy of 1 to 4 carbon atoms or halogen;
R$_5$ is hydrogen, or lower alkyl of 1 to 4 carbon atoms; and
X is the radical of an anion.

3. The triaryl methane dyestuff having the formula

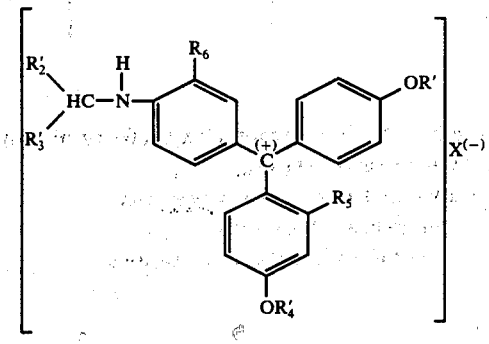

in which
R' and R$_4'$ are alkyl of 1 to 4 carbon atoms;
R$_2'$ is methyl, ethyl propyl, or isopropyl;
R$_3'$ is hydrogen, methyl or ethyl;
R$_5$ is hydrogen, halogen, alkyl of 1 to 4 carbon atoms or alkoxy of 1 to 4 carbon atoms;
R$_6$ is hydrogen or alkyl of 1 to 4 carbon atoms; and
X$^{(-)}$ is the radical of an anion.

4. The triaryl methane dyestuff having the formula

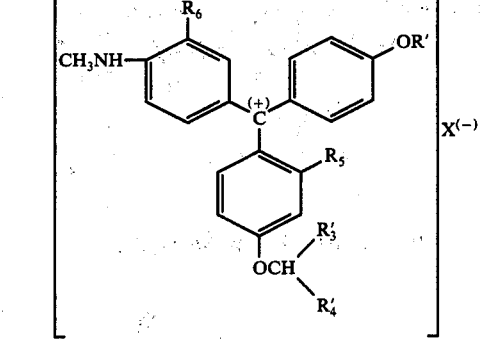

in which
R' and R$_3'$ are alkyl of 1 to 4 carbon atoms;
R$_4'$ is hydrogen or alkyl of 1 to 4 carbon atoms;
R$_5$ is hydrogen, halogen, alkyl of 1 to 4 carbon atoms or alkoxy with 1 to 4 carbon atoms;
R$_6$ is hydrogen or alkyl of 1 to 4 carbon atoms; and
X$^{(-)}$ is the radical of an anion.

5. The triaryl methane dyestuff having the formula

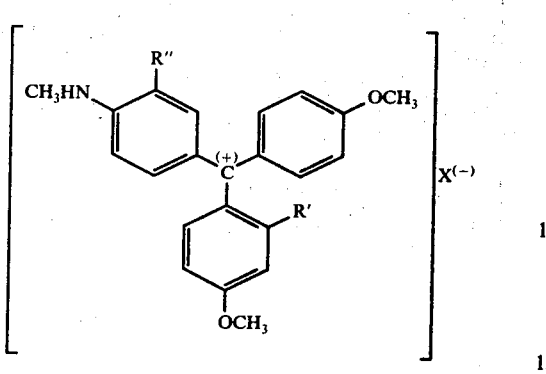

in which
R' is alkyl of 1 to 4 carbon atoms, alkoxy of 1 to 4 carbon atoms or halogen;
R" is alkyl of 1 to 4 carbon atoms; and
X$^{(-)}$ is the radical of an anion.

6. The dyestuff of claim 1 of the formula:

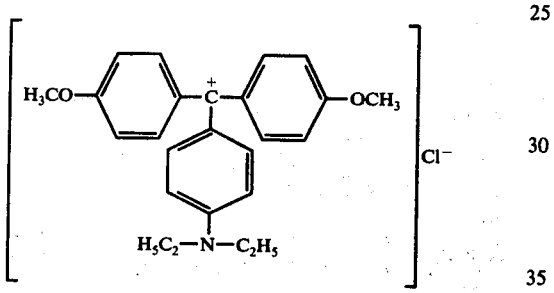

7. The dyestuff of claim 1 of the formula:

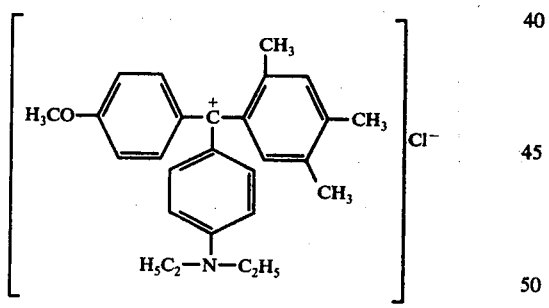

8. The dyestuff of claim 1 of the formula:

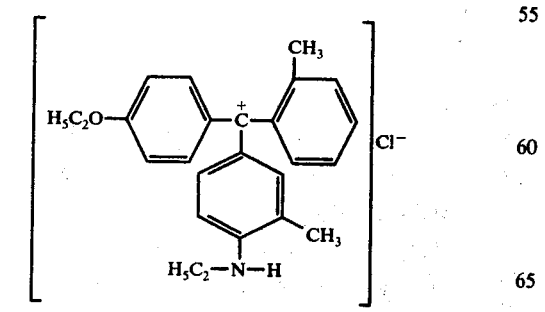

9. The dyestuff of claim 1 of the formula:

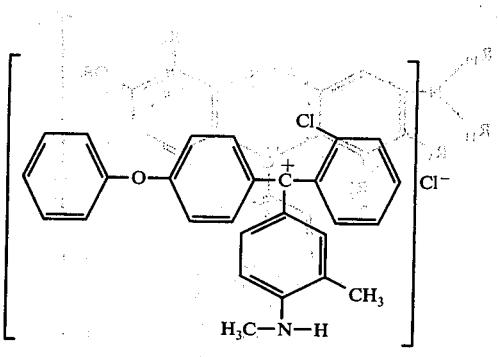

10. The dyestuff of claim 1 of the formula:

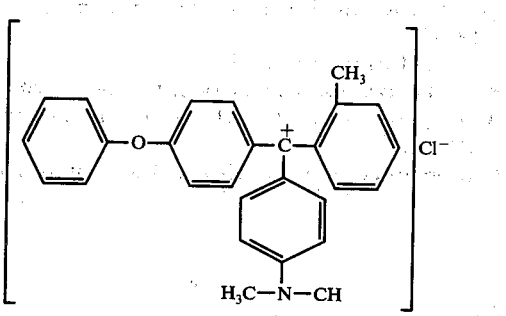

11. The dyestuff of claim 1 of the formula:

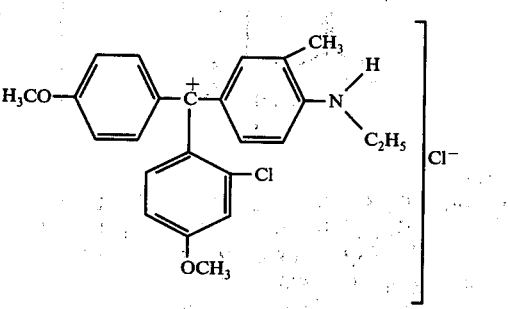

12. The dyestuff of claim 1 of the formula:

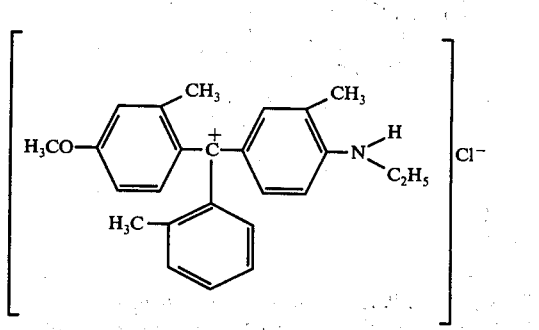

13. The dyestuff of claim 1 of the formula: